US012224682B2

(12) United States Patent
Yu et al.

(10) Patent No.: US 12,224,682 B2
(45) Date of Patent: Feb. 11, 2025

(54) COMMON-MODE VOLTAGE INJECTION CONTROL METHOD AND APPARATUS FOR INVERTER

(71) Applicant: Huawei Digital Power Technologies Co., Ltd., Shenzhen (CN)

(72) Inventors: Xinyu Yu, Shanghai (CN); Kai Xin, Shanghai (CN); Peng Dong, Shanghai (CN); Junjie Li, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 239 days.

(21) Appl. No.: 18/154,277

(22) Filed: Jan. 13, 2023

(65) Prior Publication Data

US 2023/0147775 A1   May 11, 2023

Related U.S. Application Data

(63) Continuation of application No. PCT/CN2020/101737, filed on Jul. 13, 2020.

(51) Int. Cl.
*H02M 7/538* (2007.01)
*H02M 1/12* (2006.01)
(Continued)

(52) U.S. Cl.
CPC ....... *H02M 7/53873* (2013.01); *H02M 1/123* (2021.05); *H02M 7/5395* (2013.01)

(58) Field of Classification Search
CPC ........ H02M 3/073; H02M 3/10; H02M 3/135; H02M 3/137; H02M 3/28; H02M 3/315;
(Continued)

(56) References Cited

U.S. PATENT DOCUMENTS

| | | | | |
|---|---|---|---|---|
| 8,223,511 B2 * | 7/2012 | Cheng | ..................... | H02M 1/44 363/40 |
| 9,912,251 B2 * | 3/2018 | Mondal | ..................... | H02J 9/061 |
| 10,224,830 B2 * | 3/2019 | Basic | ..................... | H02M 1/143 |

FOREIGN PATENT DOCUMENTS

| | | |
|---|---|---|
| CN | 107508483 A | 12/2017 |
| WO | 2018098974 A1 | 6/2018 |

OTHER PUBLICATIONS

Piao et al., "A Carrier-Based Discontinuous Space Vector Modulation for Three-Level NPC Inverter", IEEE, International Workshop on Integrated Power Packaging (IWIPP), XP032792552, May 3, 2015, 4 pages.

(Continued)

*Primary Examiner* — Jeffrey A Gblende
(74) *Attorney, Agent, or Firm* — Maier & Maier, PLLC

(57) ABSTRACT

A common-mode voltage injection control method and apparatus for an inverter. For the method and apparatus, a common-mode voltage for a DPWM mode is calculated based on three-phase port voltages and an output power command; a common-mode voltage for an MPC modulation mode is calculated based on the direct current bus voltage, the three-phase port voltages, and the output power command; a modulation proportion is determined based on a maximum phase voltage peak value of the three-phase port voltages, the direct current bus voltage, and a power factor of the output power command; and a common-mode injection voltage is generated based on the common-mode voltage for the DPWM mode, the modulation proportion, and the common-mode voltage for the MPC modulation mode.

16 Claims, 4 Drawing Sheets

(51) Int. Cl.
*H02M 7/5387* (2007.01)
*H02M 7/5395* (2006.01)

(58) Field of Classification Search
CPC .... H02M 3/3155; H02M 3/325; H02M 3/335; H02M 7/10; H02M 7/515; H02M 7/521; H02M 7/53; H02M 7/537; H02M 7/5383; H02M 7/538466; H02M 7/53862; H02M 7/5387; H02M 7/53871; H02M 7/53873; H02M 7/53875; H02M 7/757; H02M 7/79; H02M 3/337; H02M 3/338; H02M 3/3382; H02M 3/3384; H02M 7/538; H02M 7/53806; H02M 7/53832; H02M 7/53835; H02M 7/487; H02M 7/539; H02M 7/23; H02M 7/217; H02M 7/21; H02M 7/12; H02M 7/04; H02M 7/00; H02M 7/5395; H02M 7/483; H02M 1/0009; H02M 1/123
See application file for complete search history.

(56) References Cited

OTHER PUBLICATIONS

Shayestehfard et al., "Modified Scalar Discontinuous Pulse-Width Modulation Method for Two-Level Three-Wire Voltage Source Inverters Under Unbalanced and Distorted Conditions", The Institution of Engineering and Technology, XP006052918, Aug. 1, 2015, vol. 8, No. 8, 10 pages.

* cited by examiner

COMMON-MODE VOLTAGE INJECTION CONTROL METHOD AND APPARATUS FOR INVERTER

CROSS-REFERENCE TO RELATED APPLICATIONS

This application is a continuation of International Application No. PCT/CN2020/101737, filed on Jul. 13, 2020, the disclosure of which is hereby incorporated by reference in its entirety.

TECHNICAL FIELD

The embodiments may relate to the field of power electronics technologies, a common-mode voltage injection control method, and an apparatus for an inverter.

BACKGROUND

Fields such as photovoltaic inverters, wind power converters, frequency converters, and new energy vehicles all require the use of direct current-to-alternating current converters, also referred to as inverters. With the development of power electronics technologies, inverters with semiconductor switching devices, such as three-phase inverters, especially three-phase multilevel inverters (having more than two output levels), have been widely used. Compared with a two-level inverter, a three-level inverter has the advantages of more output levels, smaller voltage stress, smaller ripple current, and better harmonic characteristics. Therefore, three-level inverters have been widely used in the field of power electronics, especially frequency converters and photovoltaic inverters. Three-phase three-level inverters usually use semiconductor switching devices to convert direct current to alternating current. In an example of a typical three-phase bridge inverter circuit structure, a semiconductor switching transistor of each bridge arm is turned on half a sinusoidal period, and respective bridge arms of the three phases are alternately turned on and have a conduction angle difference of 120 degrees. The waveform of a resulting output voltage is approximately a sine wave. Recently, model predictive control (MPC) methods have been applied to control power converters. MPC has the advantages of discreteness and fast dynamic response and is used to control three-phase inverters in combination with rapidly developing digital signal processing technologies. The basic concept of MPC is to use a model of a system to predict future behavior of a controlled variable in a prediction space, for example, by optimizing a user-defined cost function to provide a sequence of control actions.

At present, three-phase three-level inverters face the problem of a large ripple current of a direct current bus capacitor. A direct current bus of the three-phase three-level inverter is a connection between positive and negative terminals on the direct current side of the inverter; the direct current bus capacitor is a capacitor across the direct current bus of the inverter; to enable the three-level inverter to output a zero level, a neutral wire is drawn between positive and negative terminal bus capacitors; in the process of switching on/off a power electronic switching device, a ripple current flows from the neutral wire into the positive and negative terminal bus capacitors; and a direct current bus capacitor ripple current is a ripple current (that is, the remaining frequency component current other than a direct current component) flowing through the direct current bus capacitor. If the ripple current flowing through the direct current bus capacitor is too large, it causes a capacitor loss and a temperature rise, which severely affect the life of the capacitor. Therefore, in order to avoid an excessive ripple current flowing through a single bus capacitor, it is a common practice to increase the number of bus capacitors, so as to reduce a ripple current flowing through each bus capacitor. However, doing so increases the cost significantly. In addition, a higher harmonic component in the ripple current or voltage may bring about changes in the amplitude of the current or voltage and may lead to a breakdown. Moreover, dissipation of the alternating current component may occur on the capacitor. If the ripple component of the current exceeds the maximum allowable ripple current of the capacitor, the capacitor may even be burned.

In the conventional technology, a common-mode voltage injection control method is usually used to control the magnitude of a ripple current of a direct current bus capacitor and a higher harmonic component therein, thereby helping to reduce the number of bus capacitors and the cost. Common-mode voltage injection control methods in the conventional technology are classified into two types: continuous pulse-width modulation (CPWM) and discontinuous pulse-width modulation (DPWM). The CPWM mode may be classified into no common-mode voltage injection method, a triangular wave common-mode voltage injection method, and a third harmonic common-mode voltage injection method. However, with the CPWM, the ripple current flowing through the bus capacitor is relatively small, but because the three phases of the inverter circuit all have switching device actions in each control cycle, the power electronic switching device has an increased switching loss, which then affects the efficiency. With the DPWM, because only two of the three phases have switching device actions in each control cycle, the power electronic switching device has a small switching loss, but the ripple current flowing through the bus capacitor is relatively large, which in turn requires more bus capacitors and higher cost. Therefore, the common-mode voltage injection control method in the conventional technology cannot meet the requirements of both a relatively small ripple current of a direct current bus capacitor and a relatively small switching loss.

SUMMARY

According to a common-mode voltage injection control method and apparatus for an inverter, a common-mode voltage for a discontinuous pulse-width modulation (DPWM) mode is calculated based on the three-phase port voltages and an output power command; a common-mode voltage for a model predictive control (MPC) modulation mode is calculated based on the direct current bus voltage, the three-phase port voltages, and the output power command; a modulation proportion is determined based on a maximum phase voltage peak value of the three-phase port voltages, the direct current bus voltage, and a power factor of the output power command; and a common-mode injection voltage is generated based on the common-mode voltage for the DPWM mode, the modulation proportion, and the common-mode voltage for the MPC modulation mode. In this way, the common-mode voltages for the modulation modes and the modulation proportion for generating the common-mode injection voltage are adjusted according to the real-time state of the inverter, which is conducive to achieving the flexibility of the inverter under different operating conditions, reducing the number of bus capacitors and the cost of the inverter, and reducing the switching loss of the switching devices of the inverter, thereby helping to meet the requirements of both a relatively small ripple current of a direct current bus capacitor and a relatively small switching loss.

According to a first aspect, an embodiment may provide a common-mode voltage injection control method, applied to a three-phase three-level inverter. The common-mode voltage injection control method includes: obtaining a direct current bus voltage and three-phase port voltages of the three-phase three-level inverter; calculating a common-mode voltage for a discontinuous pulse-width modulation (DPWM) mode based on the three-phase port voltages and an output power command; calculating a common-mode voltage for a model predictive control (MPC) modulation mode based on the direct current bus voltage, the three-phase port voltages, and the output power command; determining a modulation proportion based on a maximum phase voltage peak value of the three-phase port voltages, the direct current bus voltage, and a power factor of the output power command; and generating a common-mode injection voltage based on the common-mode voltage for the DPWM mode, the modulation proportion, and the common-mode voltage for the MPC modulation mode, where the common-mode injection voltage is used to generate an output voltage modulation wave of the three-phase three-level inverter, the common-mode injection voltage includes a first part and a second part, the first part of the common-mode injection voltage is the common-mode voltage for the DPWM mode, the second part of the common-mode injection voltage is the common-mode voltage for the MPC modulation mode, and a proportion of the first part of the common-mode injection voltage to the second part of the common-mode injection voltage is determined according to the modulation proportion.

According to the first aspect, a common-mode voltage for a discontinuous pulse-width modulation (DPWM) mode is calculated based on the three-phase port voltages and an output power command; a common-mode voltage for a model predictive control (MPC) modulation mode is calculated based on the direct current bus voltage, the three-phase port voltages, and the output power command; a modulation proportion is determined based on a maximum phase voltage peak value of the three-phase port voltages, the direct current bus voltage, and a power factor of the output power command; and a common-mode injection voltage is generated based on the common-mode voltage for the DPWM mode, the modulation proportion, and the common-mode voltage for the MPC modulation mode. In this way, the common-mode voltages for the modulation modes and the modulation proportion for generating the common-mode injection voltage are adjusted according to the real-time state of the inverter, which is conducive to achieving the flexibility of the inverter under different operating conditions, reducing the number of bus capacitors and the cost of the inverter, and reducing the switching loss of the switching devices of the inverter, thereby helping to meet the requirements of both a relatively small ripple current of a direct current bus capacitor and a relatively small switching loss.

According to the first aspect, in a possible implementation, the common-mode voltage injection control method further includes: calculating a common-mode voltage for a continuous pulse-width modulation (CPWM) mode based on the common-mode voltage for the DPWM mode and the common-mode voltage for the MPC modulation mode, where the common-mode voltage for the CPWM mode is between the common-mode voltage for the DPWM mode and the common-mode voltage for the MPC modulation mode; and calculating the common-mode injection voltage based on the common-mode voltage for the DPWM mode, the modulation proportion, the common-mode voltage for the MPC modulation mode, and the common-mode voltage for the CPWM mode, where the common-mode injection voltage further includes a third part, the third part of the common-mode injection voltage is the common-mode voltage for the CPWM mode, and proportions of the third part of the common-mode injection voltage to the first part of the common-mode injection voltage and the second part of the common-mode injection voltage are determined according to the modulation proportion.

In this way, the DPWM mode, the MPC modulation mode, and the CPWM mode are used, and the modulation proportion and the common-mode injection voltage are adjusted based on the data collected in real time, thereby meeting the requirements of both a relatively small ripple current of the direct current bus capacitor and a relatively small switching loss.

According to the first aspect, in a possible implementation, the common-mode voltage injection control method further includes: dividing a single-cycle time period of the three-phase port voltages into a first part, a second part, and a third part, where respective proportions of the first part of the single-cycle time period, the second part of the single-cycle time period, and the third part of the single-cycle time period in the single-cycle time period are determined according to the modulation proportion; and respectively injecting the first part of the common-mode injection voltage, the second part of the common-mode injection voltage, and the third part of the common-mode injection voltage in the first part of the single-cycle time period, the second part of the single-cycle time period, and the third part of the single-cycle time period to generate a single cycle of the output voltage modulation wave, where the output voltage modulation wave is formed by cycling the single cycle of the output voltage modulation wave.

In this way, a single-cycle time period is divided, and various parts of the common-mode injection voltage are configured correspondingly, so that the DPWM mode, the MPC modulation mode, and the CPWM mode are all used in a single-cycle time period, a single cycle of the corresponding output voltage modulation wave is generated, and then the waveform of the corresponding output voltage modulation wave is formed by cycling the single cycle, which achieves the desired control effect, thereby meeting the requirements of both a relatively small ripple current of the direct current bus capacitor and a relatively small switching loss.

According to the first aspect, in a possible implementation, the dividing a single-cycle time period of the three-phase port voltages into a first part, a second part, and a third part includes: sequentially dividing the single-cycle time period of the three-phase port voltages into six continuous and non-overlapping sectors, where each of the six sectors is sequentially divided into four continuous and non-overlapping sub-sectors; and for the four sub-sectors corresponding to each of the six sectors, the common-mode voltage injection control method further includes: sequentially marking the four sub-sectors as a first sub-sector, a second sub-sector, a third sub-sector, and a fourth sub-sector; and determining respective proportions of the first sub-sector, the second sub-sector, the third sub-sector, and the fourth sub-sector in the single-cycle time period according to the modulation proportion, where the first sub-sector corresponds to the first part of the single-cycle time period, the third sub-sector corresponds to the second part of the single-cycle time period, and the second sub-sector and the fourth sub-sector correspond to the third part of single-cycle time period.

In this way, a single-cycle time period is divided into six sectors, each sector is further divided into four sub-sectors, and various parts of the common-mode injection voltage are configured correspondingly, so that the DPWM mode, the MPC modulation mode, and the CPWM mode are all used in a single-cycle time period, a single cycle of the corresponding output voltage modulation wave is generated, and then the waveform of the corresponding output voltage modulation wave is formed by cycling the single cycle, which achieves the desired control effect, thereby meeting the requirements of both a relatively small ripple current of the direct current bus capacitor and a relatively small switching loss.

According to the first aspect, in a possible implementation, duration of the second sub-sector is the same as duration of the fourth sub-sector, and the common-mode voltage injection control method further includes: calculating a real-time value of the common-mode voltage for the CPWM mode corresponding to the real time, based on the common-mode voltage for the DPWM mode, the common-mode voltage for the MPC modulation mode, the duration of the second sub-sector, and the real time.

In this way, a single-cycle time period is divided into six sectors, each sector is further divided into four sub-sectors, various parts of the common-mode injection voltage are configured correspondingly, and the real-time value of the common-mode voltage for the CPWM mode corresponding to the real time is calculated, thereby implementing real-time collection and feedback of the current states of the direct current input end and the alternating current side three-phase ports, as well as setting of the common-mode voltage for the corresponding modulation mode based on the feedback, and thereby meeting the requirements of both a relatively small ripple current of the direct current bus capacitor and a relatively small switching loss.

According to the first aspect, in a possible implementation, the common-mode voltage injection control method further includes: dividing a time period of a plurality of consecutive cycles of the three-phase port voltages into a first segment and a second segment, where the first segment of the time period of the plurality of consecutive cycles and the second segment of the time period of the plurality of consecutive cycles each consist of one or more consecutive cycles in the time period of the plurality of consecutive cycles, and respective proportions of the first segment of the time period of the plurality of consecutive cycles and the second segment of the time period of the plurality of consecutive cycles in the time period of the plurality of consecutive cycles are determined according to the modulation proportion; and respectively injecting the first part of the common-mode injection voltage and the second part of the common-mode injection voltage in the first segment of the time period of the plurality of consecutive cycles and the second segment of the time period of the plurality of consecutive cycles to generate a plurality of consecutive cycles of the output voltage modulation wave, where the output voltage modulation wave is formed by cycling the plurality of consecutive cycles of the output voltage modulation wave.

In this way, the time period of the plurality of consecutive cycles is divided, and various parts of the common-mode injection voltage are configured correspondingly, so that the DPWM mode and the MPC modulation mode are both used in the time period T of the plurality of consecutive cycles, a plurality of consecutive cycles of the corresponding output voltage modulation wave is generated, and then the waveform of the corresponding output voltage modulation wave is formed by cycling the plurality of consecutive cycles, which achieves the desired control effect, thereby meeting the requirements of both a relatively small ripple current of the direct current bus capacitor and a relatively small switching loss.

According to the first aspect, in a possible implementation, the output power command includes an active power command, and the calculating a common-mode voltage for an MPC modulation mode based on the direct current bus voltage, the three-phase port voltages, and the output power command includes: determining a minimum value of the three-phase port voltages and a first phase voltage corresponding to the minimum value, a maximum value of the three-phase port voltages and a second phase voltage corresponding to the maximum value, and a first phase current and a second phase current of three-phase port currents of the three-phase three-level inverter that are respectively in phase with the first phase voltage and the second phase voltage; calculating a first feasible value of the common-mode voltage based on the active power command, the direct current bus voltage, the first phase voltage corresponding to the minimum value, and the first phase current; calculating a second feasible value of the common-mode voltage based on the active power command, the direct current bus voltage, the second phase voltage corresponding to the maximum value, and the second phase current; performing amplitude limiting on the first feasible value of the common-mode voltage and the second feasible value of the common-mode voltage to respectively obtain an upper limit of the common-mode injection voltage and a lower limit of the common-mode injection voltage; calculating a first real-time value of the ripple current of the direct current bus capacitor based on the upper limit of the common-mode injection voltage, the three-phase port voltages, and the three-phase port currents; calculating a second real-time value of the ripple current of the direct current bus capacitor based on the lower limit of the common-mode injection voltage, the three-phase port voltages, and the three-phase port currents; selecting one of the upper limit of the common-mode injection voltage and the lower limit of the common-mode injection voltage that correspond to the smaller one between an absolute value of the first real-time value of the ripple current of the direct current bus capacitor and an absolute value of the second real-time value of the ripple current of the direct current bus capacitor as an optimal common-mode voltage; and calculating the common-mode voltage for the MPC modulation mode based on the optimal common-mode voltage and a preset scale factor.

In this way, the common-mode voltage for the MPC modulation mode is calculated based on the direct current bus voltage, the three-phase port voltages, and the output power command, thereby implementing real-time collection and feedback of the current states of the direct current input end and the alternating current side three-phase ports, as well as setting of the common-mode voltage for the corresponding modulation mode based on the feedback, and thereby meeting the requirements of both a relatively small ripple current of the direct current bus capacitor and a relatively small switching loss.

According to the first aspect, in a possible implementation, the output power command includes an active power command and a reactive power command, and the determining the modulation proportion based on the maximum phase voltage peak value of the three-phase port voltages, the direct current bus voltage, and the power factor of the output power command includes: calculating the power factor of the output power command based on the active power command and the reactive power command; and determining the modulation proportion based on a proportion of the maximum phase voltage peak value of the three-phase port voltages to the direct current bus voltage and the power factor.

In this way, the modulation proportion is determined based on the maximum phase voltage peak value of the three-phase port voltages, the direct current bus voltage, and the power factor of the output power command, thereby implementing an adjustment to the modulation proportion based on the data collected in real time, as well as considering the output power command and accordingly setting the common-mode voltage for the corresponding modulation mode and the modulation proportion, and thereby meeting the requirements of both a relatively small ripple current of the direct current bus capacitor and a relatively small switching loss.

According to a second aspect, an embodiment may provide a common-mode voltage injection control apparatus, applied to a three-phase three-level inverter. The common-mode voltage injection control apparatus includes a memory and a processor. The memory stores a computer program, and according to the computer program, the processor performs the following operations: obtaining a direct current bus voltage and three-phase port voltages of the three-phase three-level inverter; calculating a common-mode voltage for a discontinuous pulse-width modulation (DPWM) mode based on the three-phase port voltages and an output power command; calculating a common-mode voltage for a model predictive control MPC modulation mode based on the direct current bus voltage, the three-phase port voltages, and the output power command; determining a modulation proportion based on a maximum phase voltage peak value of the three-phase port voltages, the direct current bus voltage, and a power factor of the output power command; and generating a common-mode injection voltage based on the common-mode voltage for the DPWM mode, the modulation proportion, and the common-mode voltage for the MPC modulation mode, where the common-mode injection voltage is used to generate an output voltage modulation wave of the three-phase three-level inverter, the common-mode injection voltage includes a first part and a second part, the first part of the common-mode injection voltage is the common-mode voltage for the DPWM mode, the second part of the common-mode injection voltage is the common-mode voltage for the MPC modulation mode, and a proportion of the first part of the common-mode injection voltage to the second part of the common-mode injection voltage is determined according to the modulation proportion.

According to the second aspect, a common-mode voltage for a discontinuous pulse-width modulation (DPWM) mode is calculated based on the three-phase port voltages and an output power command; a common-mode voltage for a model predictive control (MPC) modulation mode is calculated based on the direct current bus voltage, the three-phase port voltages, and the output power command; a modulation proportion is determined based on a maximum phase voltage peak value of the three-phase port voltages, the direct current bus voltage, and a power factor of the output power command; and a common-mode injection voltage is generated based on the common-mode voltage for the DPWM mode, the modulation proportion, and the common-mode voltage for the MPC modulation mode. In this way, the common-mode voltages for the modulation modes and the modulation proportion for generating the common-mode injection voltage are adjusted according to the real-time state of the inverter, which is conducive to achieving the flexibility of the inverter under different operating conditions, reducing the number of bus capacitors and the cost of the inverter, and reducing the switching loss of the switching devices of the inverter, thereby helping to meet the requirements of both a relatively small ripple current of a direct current bus capacitor and a relatively small switching loss.

According to the second aspect, in a possible implementation, the processor further performs the following operations: calculating a common-mode voltage for a continuous pulse-width modulation (CPWM) mode based on the common-mode voltage for the DPWM mode and the common-mode voltage for the MPC modulation mode, where the common-mode voltage for the CPWM mode is between the common-mode voltage for the DPWM mode and the common-mode voltage for the MPC modulation mode; and calculating the common-mode injection voltage based on the common-mode voltage for the DPWM mode, the modulation proportion, the common-mode voltage for the MPC modulation mode, and the common-mode voltage for the CPWM mode, where the common-mode injection voltage further includes a third part, the third part of the common-mode injection voltage is the common-mode voltage for the CPWM mode, and proportions of the third part of the common-mode injection voltage to the first part of the common-mode injection voltage and the second part of the common-mode injection voltage are determined according to the modulation proportion.

In this way, the DPWM mode, the MPC modulation mode, and the CPWM mode are used, and the modulation proportion and the common-mode injection voltage are adjusted based on the data collected in real time, thereby meeting the requirements of both a relatively small ripple current of the direct current bus capacitor and a relatively small switching loss.

According to the second aspect, in a possible implementation, the processor further performs the following operations: dividing a single-cycle time period of the three-phase port voltages into a first part, a second part, and a third part, where respective proportions of the first part of the single-cycle time period, the second part of the single-cycle time period, and the third part of the single-cycle time period in the single-cycle time period are determined according to the modulation proportion; and respectively injecting the first part of the common-mode injection voltage, the second part of the common-mode injection voltage, and the third part of the common-mode injection voltage in the first part of the single-cycle time period, the second part of the single-cycle time period, and the third part of the single-cycle time period to generate a single cycle of the output voltage modulation wave, where the output voltage modulation wave is formed by cycling the single cycle of the output voltage modulation wave.

In this way, a single-cycle time period is divided, and various parts of the common-mode injection voltage are configured correspondingly, so that the DPWM mode, the MPC modulation mode, and the CPWM mode are all used in a single-cycle time period, a single cycle of the corresponding output voltage modulation wave is generated, and then the waveform of the corresponding output voltage modulation wave is formed by cycling the single cycle, which achieves the desired control effect, thereby meeting the requirements of both a relatively small ripple current of the direct current bus capacitor and a relatively small switching loss.

According to the second aspect, in a possible implementation, the dividing a single-cycle time period of the three-phase port voltages into a first part, a second part, and a third part includes: sequentially dividing the single-cycle time period of the three-phase port voltages into six continuous and non-overlapping sectors, where each of the six sectors is sequentially divided into four continuous and non-overlapping sub-sectors; and for the four sub-sectors corresponding to each of the six sectors, the common-mode voltage injection control method further includes: sequentially marking the four sub-sectors as a first sub-sector, a second sub-sector, a third sub-sector, and a fourth sub-sector; and determining respective proportions of the first sub-sector, the second sub-sector, the third sub-sector, and the fourth sub-sector in the single-cycle time period according to the modulation proportion, where the first sub-sector corresponds to the first part of the single-cycle time period, the third sub-sector corresponds to the second part of the single-cycle time period, and the second sub-sector and the fourth sub-sector correspond to the third part of single-cycle time period.

In this way, a single-cycle time period is divided into six sectors, each sector is further divided into four sub-sectors, and various parts of the common-mode injection voltage are configured correspondingly, so that the DPWM mode, the MPC modulation mode, and the CPWM mode are all used in a single-cycle time period, a single cycle of the corresponding output voltage modulation wave is generated, and then the waveform of the corresponding output voltage modulation wave is formed by cycling the single cycle, which achieves the desired control effect, thereby meeting the requirements of both a relatively small ripple current of the direct current bus capacitor and a relatively small switching loss.

According to the second aspect, in a possible implementation, duration of the second sub-sector is the same as duration of the fourth sub-sector, and the processor further performs the following operation: calculating a real-time value of the common-mode voltage for the CPWM mode corresponding to real time, based on the common-mode voltage for the DPWM mode, the common-mode voltage for the MPC modulation mode, the duration of the second sub-sector, and the real time.

In this way, a single-cycle time period is divided into six sectors, each sector is further divided into four sub-sectors, various parts of the common-mode injection voltage are configured correspondingly, and the real-time value of the common-mode voltage for the CPWM mode corresponding to the real time is calculated, thereby implementing real-time collection and feedback of the current states of the direct current input end and the alternating current side three-phase ports, as well as setting of the common-mode voltage for the corresponding modulation mode based on the feedback, and thereby meeting the requirements of both a relatively small ripple current of the direct current bus capacitor and a relatively small switching loss.

According to the second aspect, in a possible implementation, the processor further performs the following operations: dividing a time period of a plurality of consecutive cycles of the three-phase port voltages into a first segment and a second segment, where the first segment of the time period of the plurality of consecutive cycles and the second segment of the time period of the plurality of consecutive cycles each consist of one or more consecutive cycles in the time period of the plurality of consecutive cycles, and respective proportions of the first segment of the time period of the plurality of consecutive cycles and the second segment of the time period of the plurality of consecutive cycles in the time period of the plurality of consecutive cycles are determined according to the modulation proportion; and respectively injecting the first part of the common-mode injection voltage and the second part of the common-mode injection voltage in the first segment of the time period of the plurality of consecutive cycles and the second segment of the time period of the plurality of consecutive cycles to generate a plurality of consecutive cycles of the output voltage modulation wave, where the output voltage modulation wave is formed by cycling the plurality of consecutive cycles of the output voltage modulation wave.

In this way, the time period of the plurality of consecutive cycles is divided, and various parts of the common-mode injection voltage are configured correspondingly, so that the DPWM mode and the MPC modulation mode are both used in the time period T of the plurality of consecutive cycles, a plurality of consecutive cycles of the corresponding output voltage modulation wave is generated, and then the waveform of the corresponding output voltage modulation wave is formed by cycling the plurality of consecutive cycles, which achieves the desired control effect, thereby meeting the requirements of both a relatively small ripple current of the direct current bus capacitor and a relatively small switching loss.

According to the second aspect, in a possible implementation, the output power command includes an active power command, and the calculating the common-mode voltage for the MPC modulation mode based on the direct current bus voltage, the three-phase port voltages, and the output power command includes: determining a minimum value of the three-phase port voltages and a first phase voltage corresponding to the minimum value, a maximum value of the three-phase port voltages and a second phase voltage corresponding to the maximum value, and a first phase current and a second phase current of three-phase port currents of the three-phase three-level inverter that are respectively in phase with the first phase voltage and the second phase voltage; calculating a first feasible value of the common-mode voltage based on the active power command, the direct current bus voltage, the first phase voltage corresponding to the minimum value, and the first phase current; calculating a second feasible value of the common-mode voltage based on the active power command, the direct current bus voltage, the second phase voltage corresponding to the maximum value, and the second phase current; performing amplitude limiting on the first feasible value of the common-mode voltage and the second feasible value of the common-mode voltage to respectively obtain an upper limit of the common-mode injection voltage and a lower limit of the common-mode injection voltage; calculating a first real-time value of the ripple current of the direct current bus capacitor based on the upper limit of the common-mode injection voltage, the three-phase port voltages, and the three-phase port currents; calculating a second real-time value of the ripple current of the direct current bus capacitor based on the lower limit of the common-mode injection voltage, the three-phase port voltages, and the three-phase port currents; selecting one of the upper limit of the common-mode injection voltage and the lower limit of the common-mode injection voltage that correspond to the smaller one between an absolute value of the first real-time value of the ripple current of the direct current bus capacitor and an absolute value of the second real-time value of the ripple current of the direct current bus capacitor as an optimal common-mode voltage; and calculating the common-mode voltage for the MPC modulation mode based on the optimal common-mode voltage and a preset scale factor.

In this way, the common-mode voltage for the MPC modulation mode is calculated based on the direct current bus voltage, the three-phase port voltages, and the output power command, thereby implementing real-time collection and feedback of the current states of the direct current input end and the alternating current side three-phase ports, as well as setting of the common-mode voltage for the corresponding modulation mode based on the feedback, and thereby meeting the requirements of both a relatively small ripple current of the direct current bus capacitor and a relatively small switching loss.

According to the second aspect, in a possible implementation, the output power command includes an active power command and a reactive power command, and the determining the modulation proportion based on the maximum phase voltage peak value of the three-phase port voltages, the direct current bus voltage, and the power factor of the output power command includes: calculating the power factor of the output power command based on the active power command and the reactive power command; and determining the modulation proportion based on a proportion of the maximum phase voltage peak value of the three-phase port voltages to the direct current bus voltage and the power factor.

In this way, the modulation proportion is determined based on the maximum phase voltage peak value of the three-phase port voltages, the direct current bus voltage, and the power factor of the output power command, thereby implementing an adjustment to the modulation proportion based on the data collected in real time, as well as considering the output power command and accordingly setting the common-mode voltage for the corresponding modulation mode and the modulation proportion, and thereby meeting the requirements of both a relatively small ripple current of the direct current bus capacitor and a relatively small switching loss.

BRIEF DESCRIPTION OF THE DRAWINGS

To describe the embodiments, the following briefly describes the accompanying drawings=.

DETAILED DESCRIPTION OF THE EMBODIMENTS

The embodiments may provide a common-mode voltage injection control method and apparatus for an inverter. Application scenarios of the common-mode voltage injection control method and apparatus for an inverter include, but are not limited to, application scenarios requiring control of the magnitude of a ripple current of a direct current bus capacitor and suppression of a higher harmonic component, such as a photovoltaic inverter application scenario, a wind power converter application scenario, and a frequency converter application scenario. The common-mode voltage injection control method and apparatus for an inverter use a three-phase three-level inverter as an example and may also be applicable to other types of inverters. According to the common-mode voltage injection control method and apparatus for an inverter, a common-mode voltage for a discontinuous pulse-width modulation (DPWM) mode is calculated based on the three-phase port voltages and an output power command; a common-mode voltage for a model predictive control (MPC) modulation mode is calculated based on the direct current bus voltage, the three-phase port voltages, and the output power command; a modulation proportion is determined based on a maximum phase voltage peak value of the three-phase port voltages, the direct current bus voltage, and a power factor of the output power command; and a common-mode injection voltage is generated based on the common-mode voltage for the DPWM mode, the modulation proportion, and the common-mode voltage for the MPC modulation mode. In this way, the common-mode voltages for the modulation modes and the modulation proportion for generating the common-mode injection voltage are adjusted according to the real-time state of the inverter, which is conducive to achieving the flexibility of the inverter under different operating conditions, reducing the number of bus capacitors and the cost of the inverter, and reducing the switching loss of the switching devices of the inverter, thereby helping to meet the requirements of both a relatively small ripple current of a direct current bus capacitor and a relatively small switching loss.

The embodiments may be adjusted and improved according to an application environment, which is not limited herein.

The following describes the embodiments with reference to the accompanying drawings.

Figure 1:
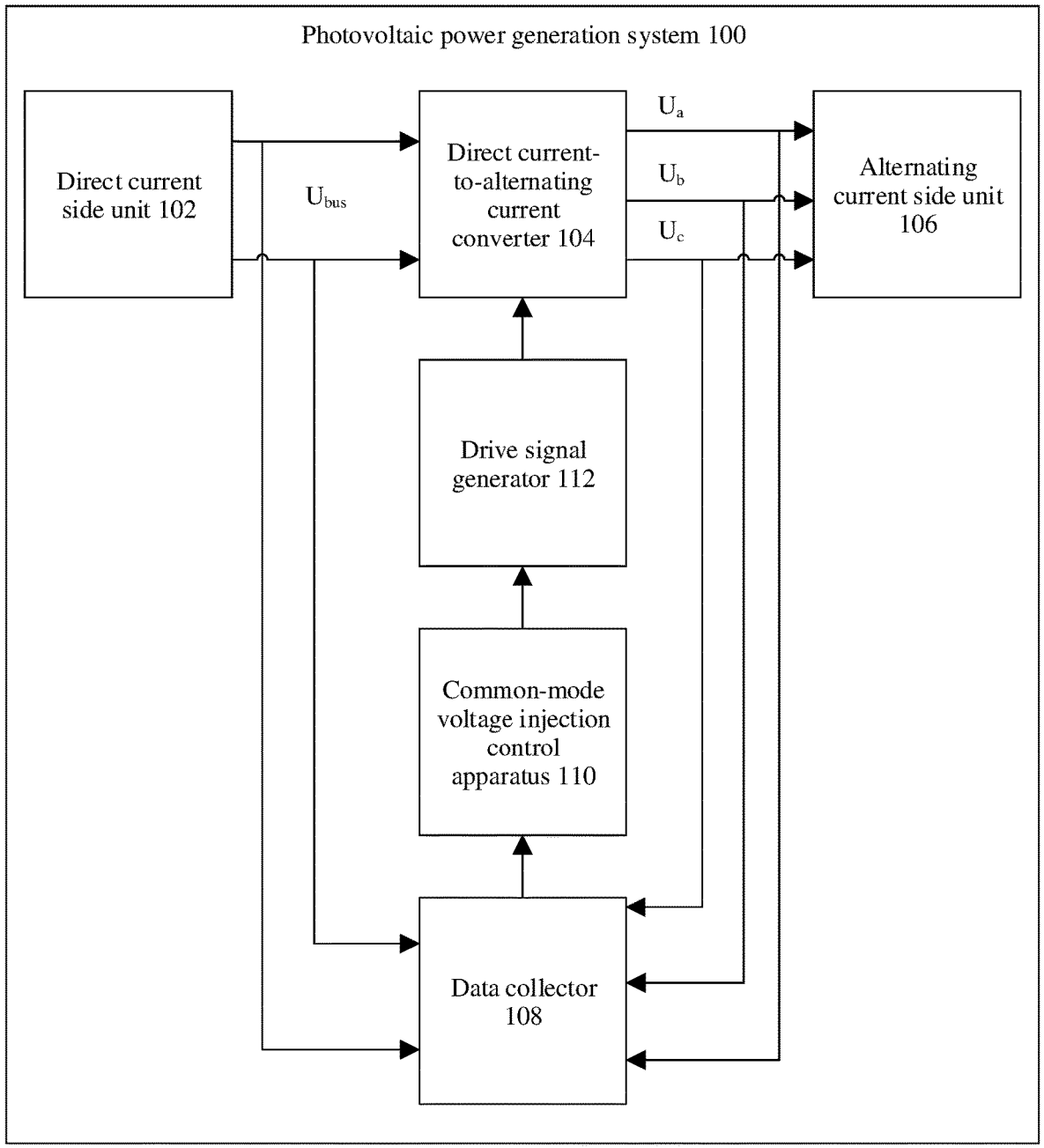
FIG. 1 is a schematic diagram of a structure of a photovoltaic power generation system including a common-mode voltage injection control apparatus for an inverter according to an embodiment.

FIG. 1 is a schematic diagram of a structure of a photovoltaic power generation system including a common-mode voltage injection control apparatus for an inverter according to an embodiment. As shown in FIG. 1, the photovoltaic power generation system 100 includes a direct current side unit 102, a direct current-to-alternating current converter 104, an alternating current side unit 106, a data collector 108, a common-mode voltage injection control apparatus 110, and a drive signal generator 112. One end of the direct current-to-alternating current converter 104 is electrically connected to the direct current side unit 102 as a direct current input end, and the other end thereof is electrically connected to the alternating current side unit 104 as an alternating current output end. The direct current-to-alternating current converter 104 is operable to transfer energy from the direct current side unit 102 to the alternating current side unit 106, which allows for conversion from direct current to alternating current. In this embodiment, the direct current-to-alternating current converter 104 is a three-phase three-level inverter. The data collector 108 is operable to collect data in real time from the direct current input end and the alternating current output end of the converter 104 and send the collected data to the common-mode voltage injection control apparatus 110. The common-mode voltage injection control apparatus 110 calculates a common-mode injection voltage based on the received data. The drive signal generator 112 injects the common-mode injection voltage into the three-phase three-level inverter to generate an output voltage modulation wave of the three-phase three-level inverter. The drive signal generator 112 is configured to generate a corresponding drive signal or control signal based on the common-mode injection voltage to control an alternating current output of the three-phase three-level inverter.

It can be understood that the structure illustrated in this embodiment does not constitute a limitation on the photovoltaic power generation system 100. In some other embodiments, the photovoltaic power generation system 100 may include more or fewer components than those shown in the figure, or may have some components combined or split, or may have a different arrangement of the components. For example, the direct current-to-alternating current converter 104 may be a separate inverter, while the data collector 108, the common-mode voltage injection control apparatus 110, and the drive signal generator 112 are all independent apparatuses. Alternatively, the direct current-to-alternating current converter 104 may be integrated with the data collector 108 and the drive signal generator 112, that is, the common-mode voltage injection control apparatus 110 receives the collected data from the converter 104 and then calculates the common-mode injection voltage, and the converter 104 generates the output voltage modulation wave accordingly.

The photovoltaic power generation system 100 can control an output voltage through pulse-width modulation (PWM). The PWM mode is described in detail below. According to the sampling control theory, narrow pulses having equal impulses but different shapes have equivalent effects on an output response waveform. Therefore, a series of narrow pulses having equal widths but unequal amplitudes can be used to approximate a sinusoidal waveform. For example, after the half waveform of the sine wave is divided into equal parts, a waveform consisting of a plurality of connected pulses is obtained by sampling. These pulses have equal widths but unequal amplitudes and change according to the sinusoidal law. Then these pulses are replaced with the same number of rectangular waves having equal amplitudes but unequal widths, and the equivalent effects are achieved. The PWM mode refers to a control method that modulates the widths (duty cycles) of these rectangular waves according to a rule to obtain an electrical quantity with a required waveform included in an equivalent output. In an inverter circuit with a semiconductor switching device, a corresponding drive signal can be generated based on a modulation signal to control a switching action and connection or disconnection of the semiconductor switching device, so that the equivalent output includes the required waveform, so as to achieve the desired control effect.

The PWM mode is classified into two types: CPWM mode and DPWM mode. CPWM means that level switching occurs in every pulse cycle, that is, the pulses appear continuously. A switching device control method corresponding to CPWM has one switching action in each switching cycle. DPWM means that no level switching occurs in a plurality of consecutive pulse cycles, that is, the pulses appear discontinuously. A switching device control method corresponding to DPWM keeps normally on or normally off within a particular switching period or a plurality of switching cycles, without a switching action. CPWM can be classified into sinusoidal pulse-width modulation (SPWM), space vector pulse-width modulation (SVPWM), and third harmonic injection pulse-width modulation (THIPWM). In SPWM, a series of rectangular pulse waves having equal amplitudes but unequal widths that are equivalent to a sinusoidal waveform are used, and a reference analog signal is compared with a high-frequency carrier waveform, so that an equivalent output waveform thereof is a sine wave. In THIPWM, a common-mode third harmonic signal is superimposed on each phase of reference waveform so that a modulation signal of a phase voltage becomes a saddle wave, and when a line voltage is combined, third harmonics between the phase wires cancel each other out, thereby obtaining a better direct current voltage utilization. SVPWM is based on a total of eight possible switch state combinations of three switching devices of the three-phase inverter. Two of them correspond to all the three switches on or off, that is, a short-circuit state to the output side, which may be considered as a zero vector. The remaining six states may be considered as space vectors that divide the d-q space into six equal parts, each space vector corresponding to an angular position. Any voltage vector can be equivalent by two of these six space vectors, and then SVPWM can obtain a more ideal third harmonic signal. The waveform of DPWM is substantially a sinusoidal waveform and is usually allocated by using two zero vectors and other non-zero vectors at the same time, so that no switching action is performed in an interval of 60 degrees at each of the positive and negative half-cycle peaks of the output voltage, that is, there is a ⅓ duty cycle. Depending on a space vector allocation policy and an interval arrangement without switching actions, DPWM can be classified into modes such as DPWMMIN, DPWMM0, DPWMM1, DPWMM2, DPWMM3, DPWMMAX, and GDPWM. In an MPC modulation mode, the output voltage is predicted by using an MPC method and controlled by using a modulation mode, such as model predictive control pulse-width modulation (MPC-PWM).

Still refer to FIG. 1. The photovoltaic power generation system 100 may use the CPWM mode, the DPWM mode, or the MPC modulation mode, and any one of the possible combinations thereof. For example, the photovoltaic power generation system 100 may use a combination of the DPWM mode and the MPC modulation mode, or may use a combination of the CPWM mode, the DPWM mode, and the MPC modulation mode. The DPWM mode used by the photovoltaic power generation system 100 may include DPWMMIN, DPWMM0, DPWMM1, DPWMM2, DPWMM3, DPWMMAX, and GDPWM or any one of the possible combinations thereof. The CPWM mode used by the photovoltaic power generation system 100 may include SPWM, SVPWM, THIPWM, and any one of the possible combinations thereof. These can be determined according to an application environment, which is not limited herein.

The direct current side unit 102 of the photovoltaic power generation system 100 is connected to a photovoltaic power generation module (not shown) and receives a direct current produced by the photovoltaic power generation module. The photovoltaic power generation module is an apparatus, such as a solar panel, that converts solar radiation energy into direct current according to the effect of solar photovoltaic power generation. In some example embodiments, alternatively, the direct current input end 104 may be connected to an energy storage element such as a battery or a fuel cell or a solar cell. A source that provides a direct current input may further include other accessories to provide additional functions, such as a programmable direct current power supply and a regenerative direct current electronic load. In a possible implementation, the source of the direct current input is another type of new energy power generation system, such as a direct current voltage source produced by a wind turbine or a hydroelectric generating set. These can be adjusted and improved according to an application environment, which is not limited herein.

The direct current-to-alternating current converter 104 is a three-phase three-level inverter in this embodiment, which includes a direct current bus capacitor consisting of positive and negative bus capacitors and has a voltage source inverter circuit and receives a direct current input from a corresponding direct current voltage source. As shown in FIG. 1, a direct current bus voltage $U_{bus}$ between the positive and negative terminals of the direct current input end may be collected at the direct current input end of the direct current-to-alternating current converter 104, while three line voltages, three phase voltages $U_a$, $U_b$, and $U_c$ (that is, three-phase port voltages), and corresponding three-phase port currents may be collected at the alternating current output end. The direct current-to-alternating current converter 104 may be an inverter circuit with semiconductor switching devices and bridge arm structures. Each bridge arm has a corresponding semiconductor switching device and can affect the output alternating current by controlling a switching action and connection or disconnection of each semiconductor switching device. The semiconductor switching device may be a giant transistor (GTR), a metal-oxide-semiconductor field effect transistor (MOSFET), an insulated gate bipolar transistor (IGBT), a gate turn-off thyristor (GTO), or another suitable device. A topological structure, such as the arrangement of semiconductor switching transistors and bridge arms, of the inverter circuit may be the common NPC type and T type, as long as the control requirements can be met, that is, the photovoltaic power generation system 100 can calculate the common-mode injection voltage based on the collected data, and then generate a corresponding drive signal to control the switching action and connection or disconnection of each semiconductor switching device of the converter 104, so that the equivalent output of the converter 104 includes the required waveform. These can be determined according to an application environment, which is not limited herein.

The direct current-to-alternating current converter 104 outputs alternating current to the alternating current side unit 106. The alternating current side unit 106 may directly output the electrical energy to a load or may return the electrical energy to the grid. In other words, the photovoltaic power generation system 100 can be applied to a passive inverter circuit or an active inverter circuit. The alternating current side unit 106 may further include a filter to suppress switching high-frequency harmonics produced by the use of the PWM modulation mode. The filter may be L-type, LC-type, or LCL-type. Alternatively, the filter may be an adjustable filter with adjustable filter parameters, so as to deal with a changing output frequency and equivalent impedance. The filter may be integrated into the direct current-to-alternating current converter 104 or may be provided separately in the alternating current side unit 106. These can be determined according to an application environment, which is not limited herein.

The data collector 108 can detect and collect in real time the phase and frequency of the voltage at the alternating current output end by using a phase-locked loop technology, for example, by using a three-phase software phase-locked loop. Alternatively, the data collector 108 can track a given signal by using a dq coordinate transformation technology, for example, make three-phase alternating current equivalent to two-phase direct current through three-phase dq control. Alternatively, the data collector 108 can collect data in real time by using other suitable technologies. These can be determined according to an application environment, which is not limited herein.

The drive signal generator 112 generates a corresponding drive signal or control signal based on the calculated common-mode injection voltage to control the output voltage of the three-phase three-level inverter. A manner of generating the drive signal is determined according to the topological structure of the semiconductor switching devices of the inverter circuit, as long as the control requirements can be met, that is, the photovoltaic power generation system 100 can generate the corresponding drive signal based on the collected data to control the switching action and connection or disconnection of each semiconductor switching device of the converter 104, so that the equivalent output of the converter 104 includes the required waveform.

In some example embodiments, a memory of the common-mode voltage injection control apparatus 110 stores a computer program, and in response to a processor executing the computer program, the processor of the common-mode voltage injection control apparatus 110 performs the following operations: obtaining a direct current bus voltage and three-phase port voltages of the three-phase three-level inverter; calculating a common-mode voltage for a discontinuous pulse-width modulation (DPWM) mode based on the three-phase port voltages and an output power command; calculating a common-mode voltage for a model predictive control (MPC) modulation mode based on the direct current bus voltage, the three-phase port voltages, and the output power command; determining a modulation proportion based on a maximum phase voltage peak value of the three-phase port voltages, the direct current bus voltage, and a power factor of the output power command; and generating a common-mode injection voltage based on the common-mode voltage for the DPWM mode, the modulation proportion, and the common-mode voltage for the MPC modulation mode, where the common-mode injection voltage is used to generate an output voltage modulation wave of the three-phase three-level inverter, the common-mode injection voltage includes a first part and a second part, the first part of the common-mode injection voltage is the common-mode voltage for the DPWM mode, the second part of the common-mode injection voltage is the common-mode voltage for the MPC modulation mode, and a proportion of the first part of the common-mode injection voltage to the second part of the common-mode injection voltage is determined according to the modulation proportion.

In this way, in some example embodiments, the photovoltaic power generation system 100 shown in FIG. 1 adjusts, according to the real-time state of the inverter, the common-mode voltages for the modulation modes and the modulation proportion for generating the common-mode injection voltage, which is conducive to achieving the flexibility of the inverter under different operating conditions, reducing the number of bus capacitors and the cost of the inverter, and reducing the switching loss of the switching devices of the inverter, thereby helping to meet the requirements of both a relatively small ripple current of a direct current bus capacitor and a relatively small switching loss.

Figure 2:
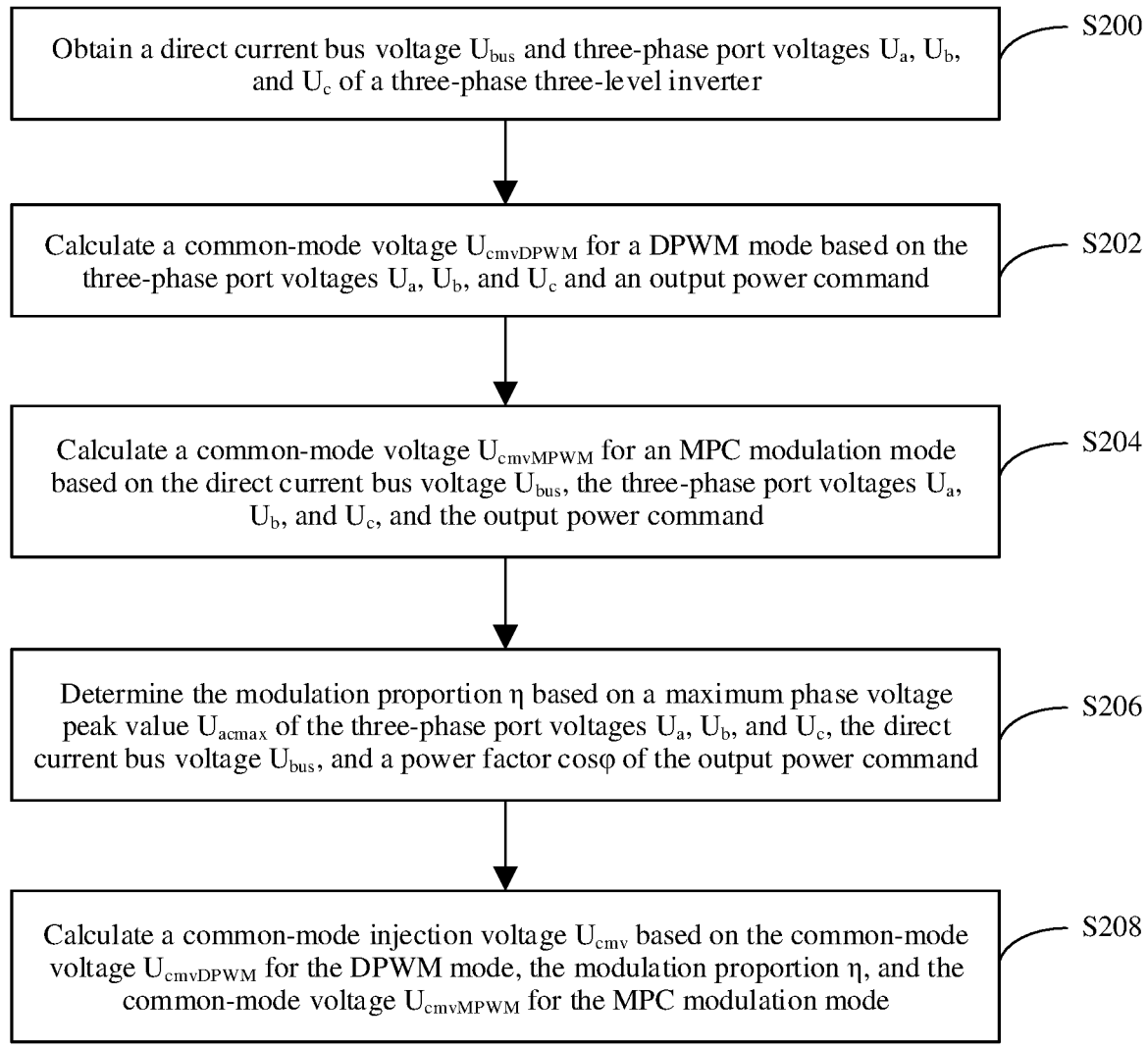
FIG. 2 is a schematic flowchart of a common-mode voltage injection control method for an inverter according to an implementation of an embodiment.

FIG. 2 is a schematic flowchart of a common-mode voltage injection control method for an inverter according to an implementation of an embodiment. As shown in FIG. 2, the common-mode voltage injection control method includes the following steps.

Step S200: Obtain a direct current bus voltage $U_{bus}$ and three-phase port voltages $U_a$, $U_b$, and $U_c$ of a three-phase three-level inverter.

The three-phase three-level inverter may include a positive direct current bus, a negative direct current bus, a neutral wire, a positive bus capacitor, and a negative bus capacitor. A positive terminal of the three-phase three-level inverter is connected to a positive terminal of the positive bus capacitor as the positive direct current bus. A negative terminal of the three-phase three-level inverter is connected to a negative terminal of the negative bus capacitor as the negative direct current bus. A neutral wire terminal of the three-phase three-level inverter is connected to a negative terminal of the positive bus capacitor and a positive terminal of the negative bus capacitor as the neutral wire. In this way, the direct current bus voltage $U_{bus}$ can be collected between the positive and negative terminals of a direct current side input end of the three-phase three-level inverter. A three-phase output end of the three-phase three-level inverter outputs three-phase alternating current. In this way, three phase voltages $U_a$, $U_b$, and $U_c$, that is, the three-phase port voltages, can be collected at alternating current side three-phase ports of the three-phase three-level inverter. The three phase voltages $U_a$, $U_b$, and $U_c$ are voltages between each of the three phases of the alternating current side three-phase ports and the neutral or the neutral wire. In some example embodiments, the direct current side input end of the three-phase three-level inverter is electrically connected to a direct current voltage source and has a corresponding voltage source inverter circuit topological structure.

It should be understood that the three-phase port voltages $U_a$, $U_b$, and $U_c$ can be obtained by a real-time detection and collection manner, for example, a phase-locked loop technology or a dq coordinate transformation technology or another suitable manner. Alternatively, the three-phase port voltages $U_a$, $U_b$, and $U_c$ can be obtained by an indirect manner, for example, can be inferred by detecting other electrical signals of the inverter. Similarly, the direct current bus voltage $U_{bus}$ can be directly detected or obtained by an indirect manner.

Step S202: Calculate a common-mode voltage $U_{cmvDPWM}$ for a DPWM mode based on the three-phase port voltages $U_a$, $U_b$, and $U_c$ and an output power command.

The output power command includes at least an active power command P. The active power command P refers to power consumed by a load resistor within one cycle of the inverter circuit. In some example embodiments, the DPWM mode may be, for example, DPWMMIN, DPWMM0, DPWMM1, DPWMM2, DPWMM3, DPWMMAX, and GDPWM. A manner of calculating the common-mode voltage $U_{cmvDPWM}$ for the DPWM mode may be a suitable manner in the conventional technology, which is not described in detail herein.

Step S204: Calculate a common-mode voltage $U_{cmvMPWM}$ for an MPC modulation mode based on the direct current bus voltage $U_{bus}$, the three-phase port voltages $U_a$, $U_b$, and $U_c$, and the output power command.

The common-mode voltage for the MPC modulation mode can be calculated by a suitable manner in the conventional technology, as long as the direct current bus voltage $U_{bus}$ and the three-phase port voltages $U_a$, $U_b$, and $U_c$ that are collected in real time are used as variables to predict and control the final common-mode voltage $U_{cmvMPWM}$ for the MPC modulation mode.

Step S206: Determine a modulation proportion η based on a maximum phase voltage peak value $U_{acmax}$ of the three-phase port voltages $U_a$, $U_b$, and $U_c$, the direct current bus voltage $U_{bus}$, and a power factor cos φ of the output power command.

The maximum peak value $U_{acmax}$ of the three-phase port voltages $U_a$, $U_b$, and $U_c$ can be obtained by a suitable manner in the conventional technology, which is not described in detail herein.

Step S208: Calculate a common-mode injection voltage $U_{cmv}$ based on the common-mode voltage $U_{cmvDPWM}$ for the DPWM mode, the modulation proportion η, and the common-mode voltage $U_{cmvMPWM}$ for the MPC modulation mode.

The common-mode injection voltage $U_{cmv}$ is to be injected into the three-phase three-level inverter to generate an output voltage modulation wave of the three-phase three-level inverter. The common-mode injection voltage $U_{cmv}$ includes a first part and a second part. The first part of the common-mode injection voltage $U_{cmv}$ is the common-mode voltage $U_{cmvDPWM}$ for the DPWM mode, the second part of the common-mode injection voltage $U_{cmv}$ is the common-mode voltage $U_{cmvMPWM}$ for the MPC modulation mode, and a proportion of the first part of the common-mode injection voltage $U_{cmv}$ to the second part of the common-mode injection voltage $U_{cmv}$ is determined according to the modulation proportion η.

As shown in FIG. 2, the common-mode injection voltage $U_{cmv}$ is used to control a ripple current of the direct current bus capacitor by using the common-mode voltage injection control method. The corresponding output voltage modulation wave may be generated based on the common-mode injection voltage $U_{cmv}$, so as to control a switching action and connection or disconnection of each semiconductor switching device of the three-phase three-level inverter, thereby reducing both a loss of the three-phase three-level inverter and the ripple current of the bus capacitor. In addition, because the common-mode injection voltage $U_{cmv}$ is based on the data of the three-phase three-level inverter collected in real time, the flexibility of the three-phase three-level inverter under different operating conditions is achieved. In some example embodiments, the generated output voltage modulation wave is used by a controller or a microprocessor or a drive module to generate a drive signal or a control signal, which then controls the switching action and connection or disconnection of each semiconductor switching device of the three-phase three-level inverter.

In the method shown in FIG. 2, the direct current bus voltage $U_{bus}$ at the direct current side input end of the three-phase three-level inverter and the three-phase port voltages $U_a$, $U_b$, and $U_c$ on the alternating current side are collected, the common-mode voltage $U_{cmvDPWM}$ for the DPWM mode is calculated based on the three-phase port voltages $U_a$, $U_b$, and $11c$ and the output power command, and the common-mode voltage $U_{cmvMPWM}$ for the MPC modulation mode is calculated based on the direct current bus voltage $U_{bus}$, the three-phase port voltages $U_a$, $U_b$, and $U_c$ and the output power command, thereby implementing real-time collection and feedback of the current states of the direct current input end and the alternating current side three-phase ports, as well as setting of the common-mode voltage for the corresponding modulation mode based on the feedback. In the method shown in FIG. 2, the modulation proportion η is further determined based on the maximum phase voltage peak value of the three-phase port voltages $U_a$, $U_b$, and $U_c$, the direct current bus voltage $U_{bus}$, and the power factor cos φ of the output power command, thereby implementing an adjustment to the modulation proportion based on the data collected in real time. The method shown in FIG. 2 further considers the output power command and sets the common-mode voltage for the corresponding modulation mode and the modulation proportion accordingly. The method shown in FIG. 2 further includes: The first part of the common-mode injection voltage $U_{cmv}$ is the common-mode voltage $U_{cmvDPWM}$ for the DPWM mode, the second part of the common-mode injection voltage $U_{cmv}$ is the common-mode voltage $U_{cmvMPWM}$ for the MPC modulation mode, and the proportion of the first part of the common-mode injection voltage $U_{cmv}$ to the second part of the common-mode injection voltage $U_{cmv}$ is determined according to the modulation proportion η.

In this way, in the method shown in FIG. 2, the DPWM mode and the MPC modulation mode are used, and the modulation proportion η and the common-mode injection voltage $U_{cmv}$ are adjusted based on the data collected in real time, thereby meeting the requirements of both a relatively small ripple current of the direct current bus capacitor and a relatively small switching loss, that is, reducing not only the number of bus capacitors and the cost of the inverter, but also the switching loss of the switching devices of the inverter. In addition, because the common-mode injection voltage $U_{cmv}$ is based on the data of the three-phase three-level inverter collected in real time, the flexibility of the three-phase three-level inverter under different operating conditions is achieved.

Figure 3:
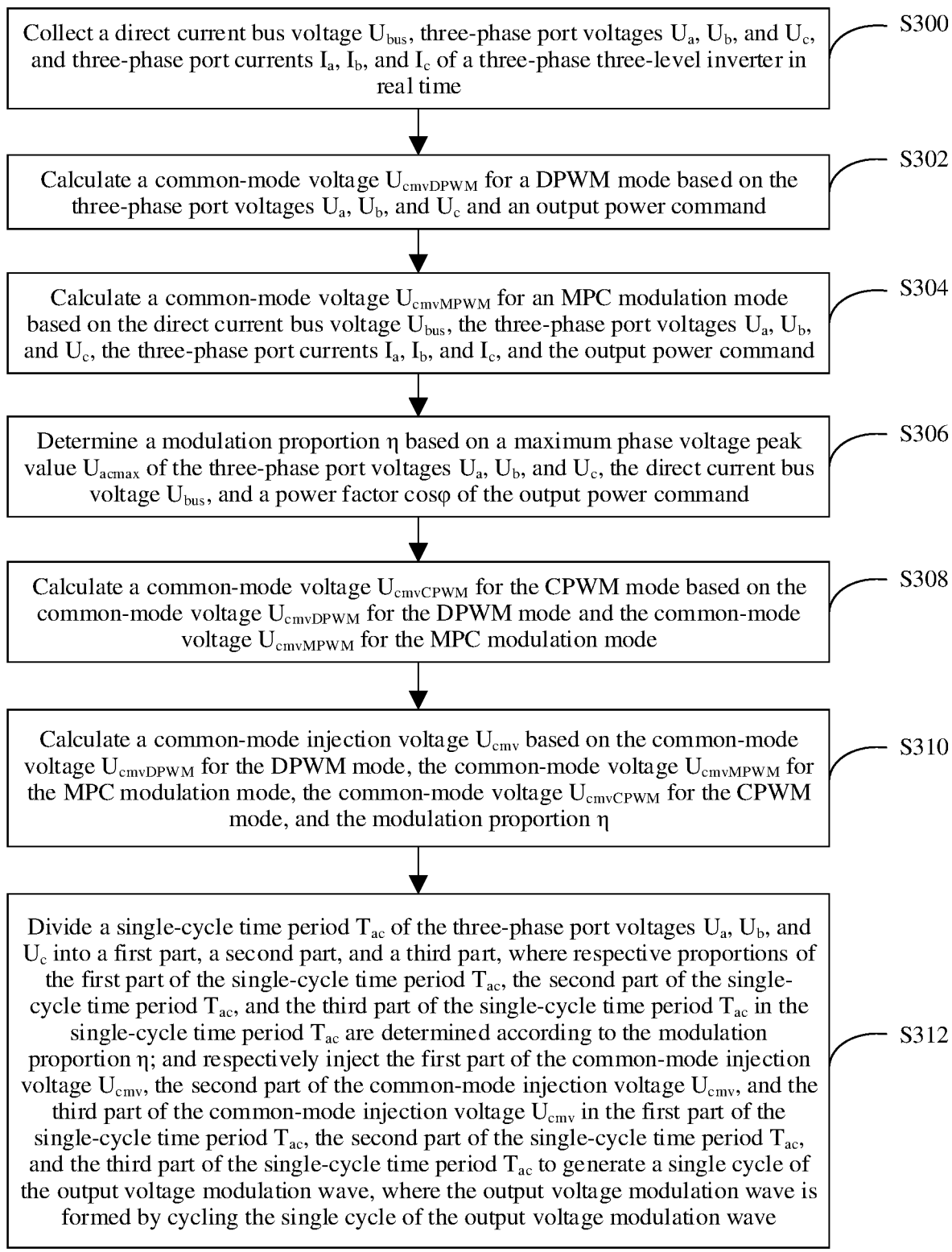
FIG. 3 is a schematic flowchart of a common-mode voltage injection control method for an inverter according to another implementation of an embodiment.

FIG. 3 is a schematic flowchart of a common-mode voltage injection control method for an inverter according to another implementation of an embodiment. As shown in FIG. 3, the common-mode voltage injection control method includes the following steps.

Step S300: Collect a direct current bus voltage $U_{bus}$, three-phase port voltages $U_a$, $U_b$, and $U_c$, and three-phase port currents $I_a$, $I_b$, and $I_c$ of a three-phase three-level inverter in real time.

The three-phase three-level inverter includes a positive direct current bus, a negative direct current bus, a neutral wire, a positive bus capacitor, and a negative bus capacitor. A positive terminal of the three-phase three-level inverter is connected to a positive terminal of the positive bus capacitor as the positive direct current bus. A negative terminal of the three-phase three-level inverter is connected to a negative terminal of the negative bus capacitor as the negative direct current bus. A neutral wire terminal of the three-phase three-level inverter is connected to a negative terminal of the positive bus capacitor and a positive terminal of the negative bus capacitor as the neutral wire. In this way, the direct current bus voltage $U_{bus}$ can be collected between the positive and negative terminals of a direct current side input end of the three-phase three-level inverter. A three-phase output end of the three-phase three-level inverter outputs three-phase alternating current. In this way, three phase voltages $U_a$, $U_b$, and $U_c$, that is, the three-phase port voltages, can be collected at alternating current side three-phase ports of the three-phase three-level inverter. The three phase voltages $U_a$, $U_b$, and $U_c$ are voltages between each of the three phases of the alternating current side three-phase ports and the neutral or the neutral wire. The three-phase port currents $I_a$, $I_b$, and $I_c$ are currents of the three phases of the alternating current side three-phase ports that are in phase with the three phase voltages $U_a$, $U_b$, and $U_c$.

In some example embodiments, the direct current side input end of the three-phase three-level inverter is electrically connected to a direct current voltage source and has a corresponding voltage source inverter circuit topological structure. The three-phase port voltages $U_a$, $U_b$, and $U_c$ and the three-phase port currents $I_a$, $I_b$, and $I_c$ can be detected and collected in real time by a phase-locked loop technology or a dq coordinate transformation technology or another suitable manner.

Step S302: Calculate a common-mode voltage $U_{cmvDPWM}$ for a DPWM mode based on the three-phase port voltages $U_a$, $U_b$, and $U_c$ and an output power command.

The output power command includes an active power command P and a reactive power command Q. In some example embodiments, the DPWM mode may be, for example, DPWMMIN, DPWMM0, DPWMM1, DPWMM2, DPWMM3, DPWMMAX, and GDPWM. A manner of calculating the common-mode voltage $U_{cmvDPWM}$ for the DPWM mode may be a suitable manner in the conventional technology, which is not described in detail herein.

Step S304: Calculate a common-mode voltage $U_{cmvMPWM}$ for an MPC modulation mode based on the direct current bus voltage $U_{bus}$, the three-phase port voltages $U_a$, $U_b$, and $U_c$, the three-phase port currents $I_a$, $I_b$, and $I_c$, and the output power command.

Step S304 may include the following details.

First, a direct current $I_{dc}$ is calculated according to the following formula (1):

$$I_{dc} = \frac{P}{U_{bus}} \quad (1)$$

where P is the active power command of the output power command, and $U_{bus}$ is the direct current bus voltage.

Then, a minimum value of the three-phase port voltages $U_a$, $U_b$, and $U_c$ and a first phase voltage $u_{min}$ corresponding to the minimum value, a maximum value of the three-phase port voltages $U_a$, $U_b$, and $U_c$ and a second phase voltage $u_{max}$ corresponding to the maximum value, and a first phase current $i_{min}$ and a second phase current $i_{max}$ of the three-phase port currents $I_a$, $I_b$, and $I_c$ of the three-phase three-level inverter that are respectively in phase with the first phase voltage $u_{min}$ and the second phase voltage $u_{max}$ are determined.

Then, a first feasible value $u_{cmv1}$ of the common-mode voltage is calculated according to the following formula (2) based on the active power command P, the direct current bus voltage $U_{bus}$, and the first phase voltage $u_{min}$ and the first phase current $I_{min}$ corresponding to the minimum value; and a second feasible value $u_{cmv2}$ of the common-mode voltage is calculated according to the following formula (3) based on the active power command P, the direct current bus voltage $U_{bus}$, and the second phase voltage $u_{max}$ and the second phase current $I_{max}$ corresponding to the maximum value.

$$u_{cmv1} = \frac{I_{dc}}{i_{min}} - u_{min} \quad (2)$$

$$u_{cmv2} = \frac{I_{dc}}{i_{max}} - u_{max} \quad (3)$$

where the direct current $I_{dc}$ can be obtained according to formula (1); $u_{cmv1}$ is the first feasible value of the common-mode voltage, and $u_{cmv2}$ is the second feasible value of the common-mode voltage.

Then, amplitude limiting is performed on the first feasible value $u_{cmv1}$ of the common-mode voltage and the second feasible value $u_{cmv2}$ of the common-mode voltage to obtain an upper limit $u_{cmv2lmt}$ of the common-mode injection voltage and a lower limit $u_{cmv2lmt}$ of the common-mode injection voltage.

Then, a first real-time value $I_{cap1}$ of the ripple current of the direct current bus capacitor is calculated according to formula (4) based on the upper limit $u_{cmv2lmt}$ of the common-mode injection voltage, the three-phase port voltages $U_a$, $U_b$, and $U_c$, and the three-phase port currents $I_a$, $I_b$, and $I_c$; and a second real-time value $I_{cap2}$ of the ripple current of the direct current bus capacitor is calculated according to formula (5) based on the lower limit $U_{cmv2lmt}$ of the common-mode injection voltage, the three-phase port voltages $U_a$, $U_b$, and $U_c$, and the three-phase port currents $I_a$, $I_b$, and $I_c$.

$$i_{cap1} = \sum_{x=a,b,c} (|u_x + u_{cmv1lmt}| \cdot i_x) \quad (4)$$

$$i_{cap2} = \sum_{x=a,b,c} (|u_x + u_{cmv2lmt}| \cdot i_x) \quad (5)$$

where $i_{cap1}$ the first real-time value of the ripple current of the direct current bus $i_{cap2}$ is capacitor, and is the second real-time value of the ripple current of the direct current bus capacitor.

Then, one of the upper limit $u_{cmv1lmt}$ of the common-mode injection voltage and the lower limit $u_{cmv2lmt}$ of the common-mode injection voltage that correspond to the smaller one between the absolute value $i_{cap1abs}$ the first real-time value $i_{cap1}$ the ripple current of the direct current bus capacitor and the absolute value $i_{cap2abs}$ of the second real-time value $i_{cap2}$ of the ripple current of the direct current bus capacitor is selected as an optimal common-mode voltage $u_{cmvopt}$. The absolute value $i_{cap1abs}$ the first real-time value $i_{cap1}$ of the ripple current of the direct current bus capacitor is compared with the absolute value $i_{cap2abs}$ the second of real-time value $i_{cap2}$ the ripple current of the direct current bus capacitor. If $i_{cap1abs}$ less than $i_{cap2abs}$, the upper limit $u_{cmv1lmt}$ of the common-mode injection voltage is then selected as the optimal common-mode voltage $u_{cmvopt}$. If $i_{cap1abs}$ is greater than $i_{cap2abs}$, the lower limit $u_{cmv2lmt}$ of the common-mode injection voltage is then selected as the optimal common-mode voltage $u_{cmvopt}$.

Finally, the common-mode voltage $u_{cmvMPWM}$ for the MPC modulation mode is calculated based on the optimal common-mode voltage $u_{cmvopt}$ and a preset scale factor $\alpha$. When the optimal common-mode voltage $u_{cmvopt}$ is greater than 0, the common-mode voltage $u_{cmvMPWM}$ for the MPC modulation mode meets the following formula (6); and when the optimal common-mode voltage $u_{cmvopt}$ is less than 0, the common-mode voltage $u_{cmvMPWM}$ for the MPC modulation mode meets the following formula (7).

$$(1-\alpha)u_{cmvopt} \leq u_{cmvMpwm} \leq (1+\alpha)u_{cmvopt} \quad (6)$$

$$(1+\alpha)u_{cmvopt} \leq u_{cmvMpwm} \leq (1-\alpha)u_{cmvopt} \quad (7)$$

where the preset scale factor $\alpha$ meets $0 \leq \alpha \leq 0.5$. In some example embodiments, the preset scale factor $\alpha$ may be set to 0.

Step S306: Determine a modulation proportion $\eta$ based on a maximum phase voltage peak value $U_{acmax}$ of the three-phase port voltages $U_a$, $U_b$, and $U_c$, the direct current bus voltage $U_{bus}$, and a power factor $\cos \varphi$ of the output power command.

The maximum peak value $U_{acmax}$ of the three-phase port voltages $U_a$, $U_b$, and $U_c$ can be obtained by a suitable manner in the conventional technology, which is not described in detail herein. A modulation ratio m is calculated according to the following formula (8); and the power factor $\cos \varphi$ is calculated according to the following formula (9).

$$m = U_{acmax}/U_{bus} \quad (8)$$

$$\cos \varphi = P/\sqrt{P^2+Q^2} \quad (9)$$

where in formula (8), the modulation ratio m is calculated based on the maximum phase voltage peak value $U_{acmax}$ of the three-phase port voltages $U_a$, $U_b$, and $U_c$ and the direct current bus voltage $U_{bus}$; and in formula (9), the power factor $\cos \varphi$ of the output power command is calculated based on the active power command P and the reactive power command Q. It should be understood that the power factor $\cos \varphi$ is a ratio of the active power P of the alternating current circuit to an apparent power, and also represents the cosine of a phase difference between the voltage and the current in the alternating current circuit. The apparent power is a quantity that represents a capacity of an alternating current electrical device and is equal to the product of an effective value of the voltage and an effective value of the current.

A relationship between the modulation ratio m, the power factor $\cos \varphi$, and the modulation proportion $\eta$ meets the following: the modulation proportion $\eta$ represents a proportion of an effective time of the DPWM mode in a total time and meets $0 \leq \eta \leq 1$; a preset modulation ratio threshold $m_0$ is configured and meets $0 \leq m_0 \leq 1.15$; a preset power factor threshold $\cos \varphi_0$ is configured and meets $0 \leq \cos \varphi_0 \leq 1$; and then the modulation proportion $\eta$ varies with the modulation ratio m and the power factor $\cos \varphi$ as follows: When the modulation ratio m is greater than the preset modulation ratio threshold $m_0$, the modulation proportion $\eta$ increases non-strictly monotonically with the decrease of the power factor $\cos \varphi$. When m is less than the preset modulation ratio threshold $m_0$, the modulation proportion $\eta$ decreases non-strictly monotonically with the decrease of the power factor $\cos \varphi$. When the power factor $\cos \varphi$ is greater than the preset power factor threshold $\cos \varphi_0$, the modulation proportion $\eta$ increases non-strictly monotonically with the decrease of the modulation ratio m. When the power factor $\cos \varphi$ is less than the preset power factor threshold $\cos \varphi_0$, the modulation proportion $\eta$ decreases non-strictly monotonically with the decrease of the modulation ratio m. In this way, the modulation proportion $\eta$ can be obtained based on the calculated modulation ratio m and power factor $\cos \varphi$, as well as the preset modulation ratio threshold $m_0$ and the preset power factor threshold $\cos \varphi_0$.

According to step S306, in some example embodiments, if the preset modulation ratio threshold $m_0$ is configured to be equal to 0.9, and the preset power factor threshold $\cos \varphi$ ® is configured to be equal to 0.54, the modulation proportion $\eta$ then varies with the modulation ratio m and the power factor $\cos \varphi$ as follows: When $1.1 \leq m \leq 1.15$, and $0.9 \leq \cos \varphi \leq 1$, n=1. When $m_0 \leq m \leq 1.1$, $\eta$ increases non-strictly monotonically with the decrease of $\cos \varphi$. When $0.7 \leq m \leq m_0$, $\eta$ decreases non-strictly monotonically with the decrease of $\cos \varphi$. When $0.54 \leq \cos \varphi < 0.9$, $\eta$ increases non-strictly monotonically with the decrease of m. When $0.2 \leq \cos \varphi < 0.54$, $\eta$ decreases non-strictly monotonically with the decrease of m. When $m < 0.7$ or $\cos \varphi < 0.2$, n=0.

Step S308: Calculate a common-mode voltage $U_{cmvCPWM}$ for a CPWM mode based on the common-mode voltage $U_{cmvDPWM}$ for the DPWM mode and the common-mode voltage $U_{cmvMPWM}$ for the MPC modulation mode.

The common-mode voltage $U_{cmvCPWM}$ for the CPWM mode is between the common-mode voltage $U_{cmvDPWM}$ for the DPWM mode and the common-mode voltage $U_{cmvMPWM}$ for the MPC modulation mode.

Step S310: Calculate a common-mode injection voltage $U_{cmv}$ based on the common-mode voltage $U_{cmvDPWM}$ for the DPWM mode, the common-mode voltage $U_{cmvMPWM}$ for the MPC modulation mode, the common-mode voltage $U_{cmvCPWM}$ for the CPWM mode, and the modulation proportion $\eta$.

The common-mode injection voltage $U_{cmv}$ includes a first part, a second part, and a third part. The first part of the common-mode injection voltage $U_{cmv}$ is the common-mode voltage $U_{cmvDPWM}$ for the DPWM mode, the second part of the common-mode injection voltage $U_{cmv}$ is the common-mode voltage $U_{cmvDPWM}$ for the MPC modulation mode, and the third part of the common-mode injection voltage is the common-mode voltage $U_{cmvCPWM}$ for the CPWM mode. A proportion of the first part of the common-mode injection voltage $U_{cmv}$ to the second part of the common-mode injection voltage $U_{cmv}$ is determined according to the modulation proportion η. Proportions of the third part of the common-mode injection voltage $U_{cmv}$ to the first part of the common-mode injection voltage $U_{cmv}$ and the second part of the common-mode injection voltage $U_{cmv}$ are determined according to the modulation proportion η.

Step S312: Divide a single-cycle time period $T_{ac}$ of the three-phase port voltages $U_a$, $U_b$, and $U_c$ into a first part, a second part, and a third part, where respective proportions of the first part of the single-cycle time period $T_{ac}$, the second part of the single-cycle time period $T_{ac}$, and the third part of the single-cycle time period $T_{ac}$ in the single-cycle time period $T_{ac}$ are determined according to the modulation proportion 11; and respectively inject the first part of the common-mode injection voltage $U_{cmv}$ the second part of the common-mode injection voltage $U_{cmv}$ and the third part of the common-mode injection voltage $U_{cmv}$ in the first part of the single-cycle time period $T_{ac}$, the second part of the single-cycle time period $T_{ac}$, and the third part of the single-cycle time period $T_{ac}$ to generate a single cycle of an output voltage modulation wave, where the output voltage modulation wave is formed by cycling the single cycle of the output voltage modulation wave.

According to step S312, in some example embodiments, the single-cycle time period $T_{ac}$ of the three-phase port voltages $U_a$, $U_b$, and $U_c$ may be sequentially divided into six continuous and non-overlapping sectors, namely, a sector I, a sector II, a sector III, a sector IV, a sector V, and a sector VI, where each of the six sectors is sequentially divided into four continuous and non-overlapping sub-sectors, namely, a sub-sector 1, a sub-sector 2, a sub-sector 3, and a sub-sector 4; for the four sub-sectors corresponding to each of the six sectors, respective proportions of the sub-sector 1, the sub-sector 2, the sub-sector 3, and the sub-sector 4 in the single-cycle time period $T_{ac}$ are determined according to the modulation proportion η; and the sub-sector 1 corresponds to the first part of the single-cycle time period; the sub-sector 3 corresponds to the second part of the single-cycle time period; and the sub-sector 2 and the sub-sector 4 correspond to the third part of single-cycle time period. Respective durations T1, T2, T3, and T4 of the sub-sector 1, the sub-sector 2, the sub-sector 3, and the sub-sector 4 may be:

$$\begin{cases} T_1 = \dfrac{T_{ac}}{6}\eta \\ T_2 = \Delta t_1 \\ T_3 = \dfrac{T_{ac}}{6}(1-\eta) - \Delta t_1 - \Delta t_2 \\ T_4 = \Delta t_2 \end{cases} \quad (10)$$

$\Delta t_1$ and $\Delta t_2$ meet: $\Delta t_1 \le \dfrac{T_{ac}}{12}(1-\eta)$, $\Delta t_2 \le \dfrac{T_{ac}}{12}(1-\eta)$ (11)

With reference to steps S310 and S312, in some example embodiments, the respective common-mode injection voltages $U_{cmv}$ for the four sub-sectors of each of the six sectors, namely, the sector I, the sector II, the sector III, the sector IV, the sector V, and the sector VI may be determined:

$$u_{cmv} = \begin{cases} u_{cmvDpwm}, & \text{Sub-sector 1} \\ u_{cmvMpwm}, & \text{Sub-sector 3} \\ u_{cmvCpwm}, & \text{Sub-sectors 2 and 4} \end{cases} \quad (12)$$

According to step S312, in some example embodiments, it is assumed that in the current cycle, a phase angle θ of the grid voltage, where 0≤θ≤360°. A sector number k can be calculated according to the following formula (13):

$k = \text{round}(\theta/60)$ (13)

where round represents a rounding function, and the value of k ranges from 1 to 6, corresponding to the six sectors, namely, the sector I, the sector II, the sector III, the sector IV, the sector V, and the sector VI. The respective durations T1, T2, T3, and T4 of the sub-sector 1, the sub-sector 2, the sub-sector 3, and the sub-sector 4 are:

$$\begin{cases} T_1 = \dfrac{T_{ac}}{6}\eta \\ T_2 = \dfrac{T_{ac}}{6}(1-\eta) \cdot \dfrac{1}{5} \\ T_3 = \dfrac{T_{ac}}{10}(1-\eta) \\ T_4 = T_2 \end{cases} \quad (14)$$

where T4 is set to be the same as T2, that is, the duration of the second sub-sector is the same as the duration of the fourth sub-sector.

With reference to step S308, step S310, and step S312, in some example embodiments, the common-mode voltage $U_{cmvCPWM}$ for the CPWM mode can be calculated according to the following formula (15) based on the common-mode voltage $U_{cmvDPWM}$ for the DPWM mode and the common-mode voltage $U_{cmvDPWM}$ for the MPC modulation mode.

$u_{cmvCpwm}(t) = l(t)u_{cmvDpwm}(t) + [1 - l(t)]u_{cmvMpwm}(t)$ (15)

where $l(t)$ meets: $l(t) = 1 - \dfrac{t}{T_2}$ (16)

where t represents the current time or real time, and is within the duration [0, T2] of the sub-sector 2 and the sub-sector 4. In this way, it should be understood that with reference to step S308, step S310, and step S312, a real-time value $U_{cmvCPWM}(t)$ of the common-mode voltage for the CPWM mode corresponding to the real time t can be calculated based on the common-mode voltage $U_{cmvDPWM}$ for the DPWM mode, the common-mode voltage $U_{cmvMPWM}$ for the MPC modulation mode, the duration T2 of the second sub-sector, and the real time t.

In the method shown in FIG. 3, the direct current bus voltage $U_{bus}$, the three-phase port voltages $U_a$, $U_b$, and $U_c$, and the three-phase port currents $I_a$, $I_b$, and $I_c$ of the three-phase three-level inverter are collected, the common-mode voltage $U_{cmvMPWM}$ for the DPWM mode is calculated based on the three-phase port voltages $U_a$, $U_b$, and $U_c$ and the output power command, and the common-mode voltage $U_{cmvMPWM}$ for the MPC modulation mode is calculated based on the direct current bus voltage $U_{bus}$, the three-phase port voltages $U_a$, $U_b$, and $U_c$, and the output power command, thereby implementing real-time collection and feedback of the current states of the direct current input end and the alternating current side three-phase ports, as well as setting of the common-mode voltage for the corresponding modulation mode based on the feedback. In the method shown in FIG. 3, the modulation proportion η is further determined based on the maximum phase voltage peak value $U_{acmax}$ of the three-phase port voltages $U_a$, $U_b$, and $U_c$, the direct current bus voltage $U_{bus}$, and the power factor cos φ of the output power command, thereby implementing an adjustment to the modulation proportion based on the data collected in real time. The method shown in FIG. 3 further considers the output power command and sets the common-mode voltage for the corresponding modulation mode and the modulation proportion accordingly. The method shown in FIG. 3 further includes the following: The first part of the common-mode injection voltage $U_{cmv}$ is the common-mode voltage $U_{cmvDPWM}$ for the DPWM mode, the second part of the common-mode injection voltage limy is the common-mode voltage $U_{cmvDPWM}$ for the MPC modulation mode, and the third part of the common-mode injection voltage $U_{cmv}$ is the common-mode voltage $U_{cmvCPWM}$ for the CPWM mode. A proportion of the first part of the common-mode injection voltage $U_{cmv}$ to the second part of the common-mode injection voltage $U_{cmv}$ is determined according to the modulation proportion η. Proportions of the third part of the common-mode injection voltage $U_{cmv}$ to the first part of the common-mode injection voltage $U_{cmv}$ and the second part of the common-mode injection voltage $U_{cmv}$ are determined according to the modulation proportion η.

In this way, in the method shown in FIG. 3, the DPWM mode, the MPC modulation mode, and the CPWM mode are used, and the modulation proportion η and the common-mode injection voltage $U_{cmv}$ are adjusted based on the data collected in real time, thereby meeting the requirements of both a relatively small ripple current of the direct current bus capacitor and a relatively small switching loss, that is, reducing not only the number of bus capacitors and the cost of the inverter, but also the switching loss of the switching devices of the inverter. In addition, because the common-mode injection voltage $U_{cmv}$ is based on the data of the three-phase three-level inverter collected in real time, the flexibility of the three-phase three-level inverter under different operating conditions is achieved.

The method shown in FIG. 3 further includes: dividing a single-cycle time period $T_{ac}$ of the three-phase port voltages $U_a$, $U_b$, and $U_c$ into a first part, a second part, and a third part, where respective proportions of the first part of the single-cycle time period $T_{ac}$, the second part of the single-cycle time period $T_{ac}$, and the third part of the single-cycle time period $T_{ac}$ in the single-cycle time period $T_{ac}$ are determined according to the modulation proportion η; and respectively injecting the first part of the common-mode injection voltage $U_{cmv}$, the second part of the common-mode injection voltage $U_{cmv}$ and the third part of the common-mode injection voltage $U_{cmv}$ in the first part of the single-cycle time period $T_{ac}$, the second part of the single-cycle time period $T_{ac}$, and the third part of the single-cycle time period $T_{ac}$ to generate a single cycle of the output voltage modulation wave, where the output voltage modulation wave is formed by cycling the single cycle of the output voltage modulation wave.

In this way, in the method shown in FIG. 3, a single-cycle time period $T_{ac}$ is divided, and various parts of the common-mode injection voltage $U_{cmv}$ are configured correspondingly, so that the DPWM mode, the MPC modulation mode, and the CPWM mode are all used in a single-cycle time period $T_{ac}$, a single cycle of the corresponding output voltage modulation wave is generated, and then the waveform of the corresponding output voltage modulation wave is formed by cycling the single cycle, which achieves the desired control effect.

Figure 4:
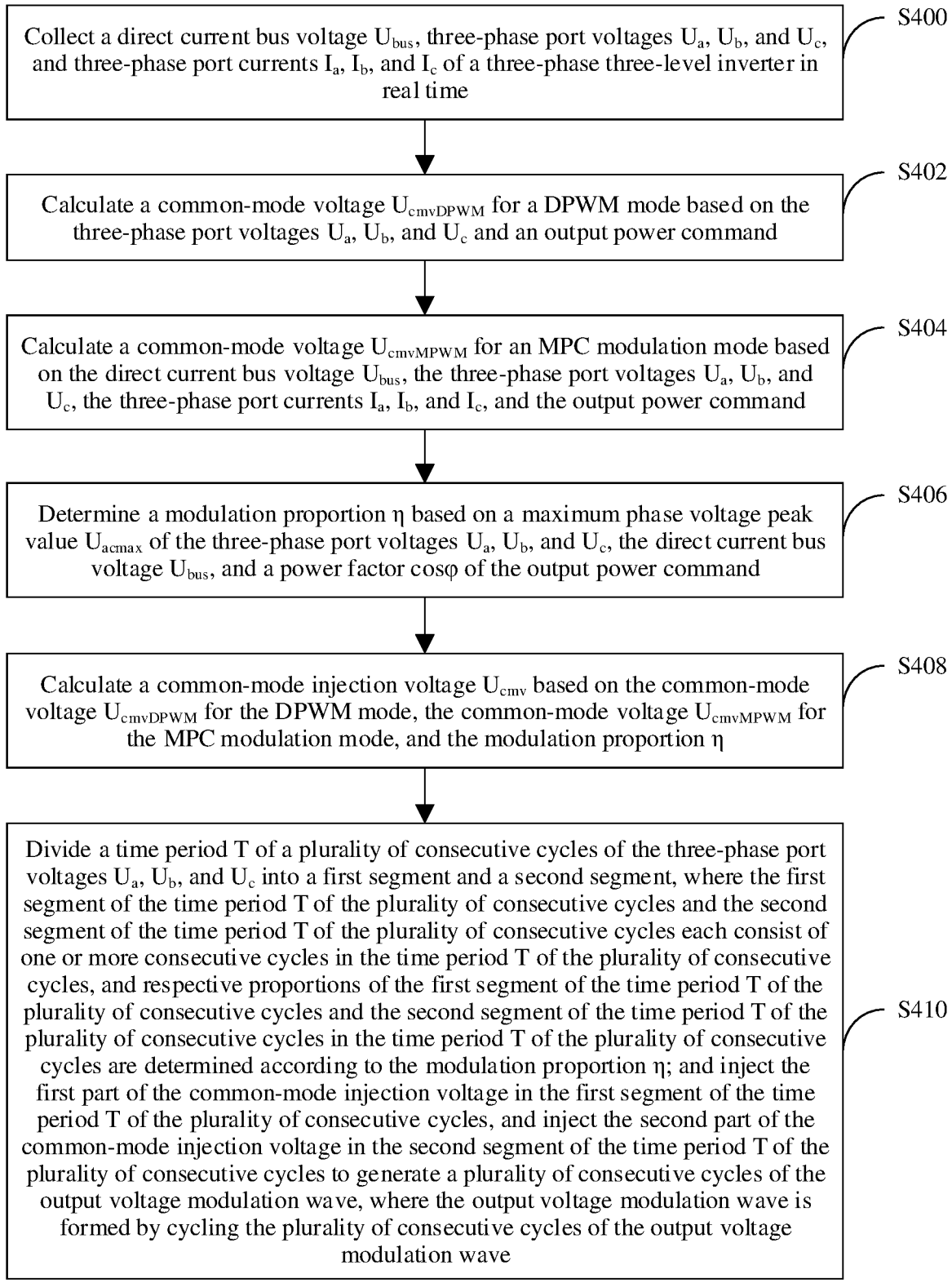
FIG. 4 is a schematic flowchart of a common-mode voltage injection control method for an inverter according to still another implementation of an embodiment.

FIG. 4 is a schematic flowchart of a common-mode voltage injection control method for an inverter according to still another implementation of an embodiment. As shown in FIG. 4, the common-mode voltage injection control method includes the following steps.

Steps S400, S402, S404, and S406 are the same as steps S300, S302, S304, and S306, respectively, and details are not repeated herein.

Step S408: Calculate a common-mode injection voltage $U_{cmv}$ based on the common-mode voltage $U_{cmvDPWM}$ for the DPWM mode, the common-mode voltage $U_{cmvMPWM}$ for the MPC modulation mode, and the modulation proportion η.

The common-mode injection voltage $U_{cmv}$ includes a first part and a second part. The first part of the common-mode injection voltage $U_{cmv}$ is the common-mode voltage $U_{cmvDPWM}$ for the DPWM mode, and the second part of the common-mode injection voltage $U_{cmv}$ is the common-mode voltage $U_{cmvDPWM}$ for the MPC modulation mode. A proportion of the first part of the common-mode injection voltage $U_{cmv}$ to the second part of the common-mode injection voltage $U_{cmv}$ is determined according to the modulation proportion η.

Step S410: Divide a time period T of a plurality of consecutive cycles of the three-phase port voltages $U_a$, $U_b$, and $U_c$ into a first segment and a second segment, where the first segment of the time period T of the plurality of consecutive cycles and the second segment of the time period T of the plurality of consecutive cycles each consist of one or more consecutive cycles in the time period T of the plurality of consecutive cycles, and respective proportions of the first segment of the time period T of the plurality of consecutive cycles and the second segment of the time period T of the plurality of consecutive cycles in the time period T of the plurality of consecutive cycles are determined according to the modulation proportion η; and inject the first part of the common-mode injection voltage in the first segment of the time period T of the plurality of consecutive cycles, and inject the second part of the common-mode injection voltage in the second segment of the time period T of the plurality of consecutive cycles to generate a plurality of consecutive cycles of the output voltage modulation wave, where the output voltage modulation wave is formed by cycling the plurality of consecutive cycles of the output voltage modulation wave.

It is assumed that the time period T of N consecutive cycles is divided into the first segment and the second segment, where the first segment consists of M consecutive cycles, and the second segment consists of the remaining N−M consecutive cycles. Then the M consecutive cycles in the first segment meet $u_{cmv}=U_{cmvDpwm}$, and the remaining N−M consecutive cycles in the second segment meet $u_{cmv}=U_{cmvMpwm}$. In addition, M and N meet:

$$M=\text{round}(N\cdot\eta) \quad (17)$$

where round represents a rounding function.

According to step S410, in some example embodiments, N may be set to 10, that is, in a time period of M consecutive cycles, $u_{cmv}=u_{cmvDpwm}$ is met; and in a time period of 10−M consecutive cycles, $u_{cmv}=u_{cmvMpwm}$ is met.

In this way, in the method shown in FIG. 4, the DPWM mode and the MPC modulation mode are used, and the modulation proportion η and the common-mode injection voltage $U_{cmv}$ are adjusted based on the data collected in real time, thereby meeting the requirements of both a relatively small ripple current of the direct current bus capacitor and a relatively small switching loss, that is, reducing not only the number of bus capacitors and the cost of the inverter, but also the switching loss of the switching devices of the inverter. In addition, because the common-mode injection voltage $U_{cmv}$ is based on the data of the three-phase three-level inverter collected in real time, the flexibility of the three-phase three-level inverter under different operating conditions is achieved.

In addition, in the method shown in FIG. 4, the time period T of the plurality of consecutive cycles is divided, and various parts of the common-mode injection voltage $U_{cmv}$ are configured correspondingly, so that the DPWM mode and the MPC modulation mode are both used in the time period T of the plurality of consecutive cycles, a plurality of consecutive cycles of the corresponding output voltage modulation wave is generated, and then the waveform of the corresponding output voltage modulation wave is formed by cycling the plurality of consecutive cycles, which achieves the desired control effect.

The embodiments may be implemented by using any one of or a combination of hardware, software, firmware, or a solid-state logic circuit, and may be implemented in combination with signal processing, and a control and/or dedicated circuit. The device or apparatus provided in the embodiments may include one or more processors (such as a microprocessor, a controller, a digital signal processor (DSP), an application-specific integrated circuit (ASIC), and a field-programmable gate array (FPGA)). These processors process various computer executable instructions to control an operation of the device or apparatus. The device or apparatus provided in the embodiments may include a system bus or a data transmission system that couples various components together. The system bus may include any one of or a combination of different bus structures, such as a memory bus or a memory controller, a peripheral bus, a universal serial bus, and/or a processor or a local bus utilizing any one of the plurality of bus architectures. The device or apparatus provided in the embodiments may be provided separately, may be a part of a system, or may be a part of another device or apparatus.

The embodiments may include or may be combined with a non-transitory computer-readable storage medium, for example, one or more storage devices capable of providing non-transitory data storage. The non-transitory computer-readable storage medium/storage device may be configured to store data, program modules, and/or instructions that, when executed by a processor of the device or apparatus provided in the embodiments, cause the device or apparatus to perform the related operations. The non-transitory computer-readable storage medium/storage device may include one or more of the following characteristics: volatile, non-volatile, dynamic, static, readable/writable, read-only, random access, sequential access, location addressability, file addressability, and content addressability. In one or more example embodiments, the non-transitory computer-readable storage medium/storage device may be integrated into the device or apparatus provided in the embodiments, or belong to a common system. The non-transitory computer-readable storage medium/storage device may include an optical storage device, and a semiconductor storage device and/or a magnetic storage device, and may include a random access memory (RAM), a flash memory, a read-only memory (ROM), an erasable programmable read-only memory (EPROM), an electrically erasable programmable read-only memory (EEPROM), a register, a hard disk, a removable hard disk, a recordable and/or rewritable compact disc (CD), a digital versatile disc (DVD), and a high-capacity medium storage device or any other forms of suitable storage media.

Described above are implementations of the embodiments. It should be noted that the steps of the method described in the embodiments may be subject to sequence adjustment, combination, and deletion based on an actual requirement. In the foregoing embodiments, the description of each embodiment has respective focuses. For a part that is not described in detail in an embodiment, refer to related descriptions in other embodiments. It can be understood that the structure illustrated in the embodiments and the accompanying drawings does not constitute a limitation on the related apparatus or system. In some other embodiments, the related apparatus or system may include more or fewer components than those shown in the embodiments and the accompanying drawings, or some components may be combined, or some components may be split, or different component arrangements may be used. Persons skilled in the art should understand that various modifications or changes may be made to the arrangements, operations, and details of the methods and devices recorded in the embodiments without departing from the scope of the embodiments; and several improvements and refinements may further be made without departing from the principle of the embodiments, and these improvements and refinements shall also be construed to be within the scope of the embodiments.

What is claimed is:

1. A common-mode voltage injection control method, wherein the common-mode voltage injection control method is applied to a three-phase three-level inverter, and the method comprises:
    obtaining a direct current bus voltage and three-phase port voltages of the three-phase three-level inverter;
    calculating a common-mode voltage for a discontinuous pulse-width modulation (DPWM) mode based on the three-phase port voltages and an output power command;
    calculating a common-mode voltage for a model predictive control (MPC) modulation mode based on the direct current bus voltage, the three-phase port voltages, and the output power command;
    determining a modulation proportion based on a maximum phase voltage peak value of the three-phase port voltages, the direct current bus voltage, and a power factor of the output power command; and
    generating a common-mode injection voltage based on the common-mode voltage for the DPWM mode, the modulation proportion, and the common-mode voltage for the MPC modulation mode, wherein
    the common-mode injection voltage is used to generate an output voltage modulation wave of the three-phase three-level inverter, the common-mode injection voltage comprises a first part and a second part, the first part of the common-mode injection voltage is the common-mode voltage for the DPWM mode, the second part of the common-mode injection voltage is the common-mode voltage for the MPC modulation mode, and a proportion of the first part of the common-mode injection voltage to the second part of the common-mode injection voltage is determined according to the modulation proportion.

2. The common-mode voltage injection control method according to claim 1, further comprising:

calculating a common-mode voltage for a continuous pulse-width modulation (CPWM) mode based on the common-mode voltage for the DPWM mode and the common-mode voltage for the MPC modulation mode, wherein the common-mode voltage for the CPWM mode is between the common-mode voltage for the DPWM mode and the common-mode voltage for the MPC modulation mode; and calculating the common-mode injection voltage based on the common-mode voltage for the DPWM mode, the modulation proportion, the common-mode voltage for the MPC modulation mode, and the common-mode voltage for the CPWM mode, wherein the common-mode injection voltage further comprises a third part, the third part of the common-mode injection voltage is the common-mode voltage for the CPWM mode, and proportions of the third part of the common-mode injection voltage to the first part of the common-mode injection voltage and the second part of the common-mode injection voltage are determined according to the modulation proportion.

3. The common-mode voltage injection control method according to claim 2, further comprising:

dividing a single-cycle time period of the three-phase port voltages into a first part, a second part, and a third part, wherein respective proportions of the first part of the single-cycle time period, the second part of the single-cycle time period, and the third part of the single-cycle time period in the single-cycle time period are determined according to the modulation proportion; and respectively injecting the first part of the common-mode injection voltage, the second part of the common-mode injection voltage, and the third part of the common-mode injection voltage in the first part of the single-cycle time period, the second part of the single-cycle time period, and the third part of the single-cycle time period to generate a single cycle of the output voltage modulation wave, wherein the output voltage modulation wave is formed by cycling the single cycle of the output voltage modulation wave.

4. The common-mode voltage injection control method according to claim 3, wherein dividing the single-cycle time period of the three-phase port voltages into the first part, the second part, and the third part further comprises:

sequentially dividing the single-cycle time period of the three-phase port voltages into six continuous and non-overlapping sectors, wherein each of the six sectors is sequentially divided into four continuous and non-overlapping sub-sectors; and for the four sub-sectors corresponding to each of the six sectors, the common-mode voltage injection control method further comprises:

sequentially marking the four sub-sectors as a first sub-sector, a second sub-sector, a third sub-sector, and a fourth sub-sector; and determining respective proportions of the first sub-sector, the second sub-sector, the third sub-sector, and the fourth sub-sector in the single-cycle time period according to the modulation proportion, wherein the first sub-sector corresponds to the first part of the single-cycle time period, the third sub-sector corresponds to the second part of the single-cycle time period, and the second sub-sector and the fourth sub-sector correspond to the third part of single-cycle time period.

5. The common-mode voltage injection control method according to claim 4, wherein duration of the second sub-sector is the same as duration of the fourth sub-sector, and the common-mode voltage injection control method further comprises:

calculating a real-time value of the common-mode voltage for the CPWM mode corresponding to the real time, based on the common-mode voltage for the DPWM mode, the common-mode voltage for the MPC modulation mode, the duration of the second sub-sector, and the real time.

6. The common-mode voltage injection control method according to claim 1, further comprising:

dividing a time period of a plurality of consecutive cycles of the three-phase port voltages into a first segment and a second segment, wherein the first segment of the time period of the plurality of consecutive cycles and the second segment of the time period of the plurality of consecutive cycles each consist of one or more consecutive cycles in the time period of the plurality of consecutive cycles, and respective proportions of the first segment of the time period of the plurality of consecutive cycles and the second segment of the time period of the plurality of consecutive cycles in the time period of the plurality of consecutive cycles are determined according to the modulation proportion; and respectively injecting the first part of the common-mode injection voltage and the second part of the common-mode injection voltage in the first segment of the time period of the plurality of consecutive cycles and the second segment of the time period of the plurality of consecutive cycles to generate a plurality of consecutive cycles of the output voltage modulation wave, wherein the output voltage modulation wave is formed by cycling the plurality of consecutive cycles of the output voltage modulation wave.

7. The common-mode voltage injection control method according to claim 1, wherein the output power command comprises an active power command, and calculating the common-mode voltage for the MPC modulation mode based on the direct current bus voltage, the three-phase port voltages, and the output power command further comprises:

determining a minimum value of the three-phase port voltages and a first phase voltage corresponding to the minimum value, a maximum value of the three-phase port voltages and a second phase voltage corresponding to the maximum value, and a first phase current and a second phase current of three-phase port currents of the three-phase three-level inverter that are respectively in phase with the first phase voltage and the second phase voltage;

calculating a first feasible value of the common-mode voltage based on the active power command, the direct current bus voltage, the first phase voltage corresponding to the minimum value, and the first phase current;

calculating a second feasible value of the common-mode voltage based on the active power command, the direct current bus voltage, the second phase voltage corresponding to the maximum value, and the second phase current;

performing amplitude limiting on the first feasible value of the common-mode voltage and the second feasible value of the common-mode voltage to respectively obtain an upper limit of the common-mode injection voltage and a lower limit of the common-mode injection voltage;

calculating a first real-time value of a ripple current of the direct current bus capacitor based on the upper limit of the common-mode injection voltage, the three-phase port voltages, and the three-phase port currents;

calculating a second real-time value of the ripple current of the direct current bus capacitor based on the lower limit of the common-mode injection voltage, the three-phase port voltages, and the three-phase port currents;

selecting one of the upper limit of the common-mode injection voltage and the lower limit of the common-mode injection voltage that correspond to the smaller one between an absolute value of the first real-time value of the ripple current of the direct current bus capacitor and an absolute value of the second real-time value of the ripple current of the direct current bus capacitor as an optimal common-mode voltage; and calculating the common-mode voltage for the MPC modulation mode based on the optimal common-mode voltage and a preset scale factor.

8. The common-mode voltage injection control method according to claim 1, wherein the output power command comprises an active power command and a reactive power command, and determining the modulation proportion based on the maximum phase voltage peak value of the three-phase port voltages, the direct current bus voltage, and the power factor of the output power command further comprises:

calculating the power factor of the output power command based on the active power command and the reactive power command; and determining the modulation proportion based on a proportion of the maximum phase voltage peak value of the three-phase port voltages to the direct current bus voltage and the power factor.

9. A common-mode voltage injection control apparatus, wherein the common-mode voltage injection control apparatus is applied to a three-phase three-level inverter and comprises a memory and a processor, the memory stores a computer program, and according to the computer program, the processor performs the following operations:

obtaining a direct current bus voltage and three-phase port voltages of the three-phase three-level inverter;

calculating a common-mode voltage for a discontinuous pulse-width modulation DPWM mode based on the three-phase port voltages and an output power command;

calculating a common-mode voltage for a model predictive control MPC modulation mode based on the direct current bus voltage, the three-phase port voltages, and the output power command;

determining a modulation proportion based on a maximum phase voltage peak value of the three-phase port voltages, the direct current bus voltage, and a power factor of the output power command; and generating a common-mode injection voltage based on the common-mode voltage for the DPWM mode, the modulation proportion, and the common-mode voltage for the MPC modulation mode, wherein the common-mode injection voltage is used to generate an output voltage modulation wave of the three-phase three-level inverter, the common-mode injection voltage comprises a first part and a second part, the first part of the common-mode injection voltage is the common-mode voltage for the DPWM mode, the second part of the common-mode injection voltage is the common-mode voltage for the MPC modulation mode, and a proportion of the first part of the common-mode injection voltage to the second part of the common-mode injection voltage is determined according to the modulation proportion.

10. The common-mode voltage injection control apparatus according to claim 9, wherein the processor further performs the following operations:

calculating a common-mode voltage for a continuous pulse-width modulation CPWM mode based on the common-mode voltage for the DPWM mode and the common-mode voltage for the MPC modulation mode, wherein the common-mode voltage for the CPWM mode is between the common-mode voltage for the DPWM mode and the common-mode voltage for the MPC modulation mode; and calculating the common-mode injection voltage based on the common-mode voltage for the DPWM mode, the modulation proportion, the common-mode voltage for the MPC modulation mode, and the common-mode voltage for the CPWM mode, wherein the common-mode injection voltage further comprises a third part, the third part of the common-mode injection voltage is the common-mode voltage for the CPWM mode, and proportions of the third part of the common-mode injection voltage to the first part of the common-mode injection voltage and the second part of the common-mode injection voltage are determined according to the modulation proportion.

11. The common-mode voltage injection control apparatus according to claim 10, wherein the processor further performs the following operations:

dividing a single-cycle time period of the three-phase port voltages into a first part, a second part, and a third part, wherein respective proportions of the first part of the single-cycle time period, the second part of the single-cycle time period, and the third part of the single-cycle time period in the single-cycle time period are determined according to the modulation proportion; and respectively injecting the first part of the common-mode injection voltage, the second part of the common-mode injection voltage, and the third part of the common-mode injection voltage in the first part of the single-cycle time period, the second part of the single-cycle time period, and the third part of the single-cycle time period to generate a single cycle of the output voltage modulation wave, wherein the output voltage modulation wave is formed by cycling the single cycle of the output voltage modulation wave.

12. The common-mode voltage injection control apparatus according to claim 11, wherein dividing the single-cycle time period of the three-phase port voltages into the first part, the second part, and the third part further comprises:

sequentially dividing the single-cycle time period of the three-phase port voltages into six continuous and non-overlapping sectors, wherein each of the six sectors is sequentially divided into four continuous and non-overlapping sub-sectors; and for the four sub-sectors corresponding to each of the six sectors, the common-mode voltage injection control method further comprises:

sequentially marking the four sub-sectors as a first sub-sector, a second sub-sector, a third sub-sector, and a fourth sub-sector; and determining respective proportions of the first sub-sector, the second sub-sector, the third sub-sector, and the fourth sub-sector in the single-cycle time period according to the modulation proportion, wherein the first sub-sector corresponds to the first part of the single-cycle time period, the third sub-sector corresponds to the second part of the single-cycle time period, and the second sub-sector and the fourth sub-sector correspond to the third part of single-cycle time period.

13. The common-mode voltage injection control apparatus according to claim 12, wherein a duration of the second sub-sector is the same as a duration of the fourth sub-sector, and the processor further performs the following operations:
calculating a real-time value of the common-mode voltage for the CPWM mode corresponding to the real time, based on the common-mode voltage for the DPWM mode, the common-mode voltage for the MPC modulation mode, the duration of the second sub-sector, and the real time.

14. The common-mode voltage injection control apparatus according to claim 1, wherein the processor further performs the following operations:
dividing a time period of a plurality of consecutive cycles of the three-phase port voltages into a first segment and a second segment, wherein the first segment of the time period of the plurality of consecutive cycles and the second segment of the time period of the plurality of consecutive cycles each consist of one or more consecutive cycles in the time period of the plurality of consecutive cycles, and respective proportions of the first segment of the time period of the plurality of consecutive cycles and the second segment of the time period of the plurality of consecutive cycles in the time period of the plurality of consecutive cycles are determined according to the modulation proportion; and
respectively injecting the first part of the common-mode injection voltage and the second part of the common-mode injection voltage in the first segment of the time period of the plurality of consecutive cycles and the second segment of the time period of the plurality of consecutive cycles to generate a plurality of consecutive cycles of the output voltage modulation wave, wherein the output voltage modulation wave is formed by cycling the plurality of consecutive cycles of the output voltage modulation wave.

15. The common-mode voltage injection control apparatus according to claim 1, wherein the output power command comprises an active power command, and calculating the common-mode voltage for the MPC modulation mode based on the direct current bus voltage, the three-phase port voltages, and the output power command further comprises:
determining a minimum value of the three-phase port voltages and a first phase voltage corresponding to the minimum value, a maximum value of the three-phase port voltages and a second phase voltage corresponding to the maximum value, and a first phase current and a second phase current of three-phase port currents of the three-phase three-level inverter that are respectively in phase with the first phase voltage and the second phase voltage;
calculating a first feasible value of the common-mode voltage based on the active power command, the direct current bus voltage, the first phase voltage corresponding to the minimum value, and the first phase current;
calculating a second feasible value of the common-mode voltage based on the active power command, the direct current bus voltage, the second phase voltage corresponding to the maximum value, and the second phase current;
performing amplitude limiting on the first feasible value of the common-mode voltage and the second feasible value of the common-mode voltage to respectively obtain an upper limit of the common-mode injection voltage and a lower limit of the common-mode injection voltage;
calculating a first real-time value of a ripple current of the direct current bus capacitor based on the upper limit of the common-mode injection voltage, the three-phase port voltages, and the three-phase port currents;
calculating a second real-time value of the ripple current of the direct current bus capacitor based on the lower limit of the common-mode injection voltage, the three-phase port voltages, and the three-phase port currents;
selecting one of the upper limit of the common-mode injection voltage and the lower limit of the common-mode injection voltage that correspond to the smaller one between an absolute value of the first real-time value of the ripple current of the direct current bus capacitor and an absolute value of the second real-time value of the ripple current of the direct current bus capacitor as an optimal common-mode voltage; and
calculating the common-mode voltage for the MPC modulation mode based on the optimal common-mode voltage and a preset scale factor.

16. The common-mode voltage injection control apparatus according to claim 1, wherein the output power command comprises an active power command and a reactive power command, and determining the modulation proportion based on the maximum phase voltage peak value of the three-phase port voltages, the direct current bus voltage, and the power factor of the output power command further comprises:
calculating the power factor of the output power command based on the active power command and the reactive power command; and
determining the modulation proportion based on a proportion of the maximum phase voltage peak value of the three-phase port voltages to the direct current bus voltage and the power factor.

* * * * *